US008759462B2

(12) United States Patent
Oikawa

(10) Patent No.: US 8,759,462 B2
(45) Date of Patent: Jun. 24, 2014

(54) METHOD FOR PRODUCING RESIST COPOLYMER HAVING LOW MOLECULAR WEIGHT

(71) Applicant: Maruzen Petrochemical Co., Ltd., Tokyo (JP)

(72) Inventor: Tomo Oikawa, Ichihara (JP)

(73) Assignee: Maruzen Petrochemical Co., Ltd., Tokyo (JP)

(*) Notice: Subject to any disclaimer, the term of this patent is extended or adjusted under 35 U.S.C. 154(b) by 0 days.

(21) Appl. No.: 13/675,277

(22) Filed: Nov. 13, 2012

(65) Prior Publication Data
US 2013/0123446 A1 May 16, 2013

(30) Foreign Application Priority Data

Nov. 14, 2011 (JP) ................................. 2011-249049

(51) Int. Cl.
C08F 4/04 (2006.01)
C08F 2/04 (2006.01)
(52) U.S. Cl.
USPC .................. 526/218.1; 526/72; 430/270.1
(58) Field of Classification Search
USPC ....................... 526/72, 218.1; 430/270.1
See application file for complete search history.

(56) References Cited

U.S. PATENT DOCUMENTS 6,841,331 B2 * 1/2005 Barclay et al. ............. 430/270.1
7,045,582 B2 * 5/2006 Yamagishi et al. ............ 526/82
2005/0287474 A1 * 12/2005 Yamagishi et al. ......... 430/270.1
2007/0111137 A1 * 5/2007 Yamagishi et al. ......... 430/270.1
2010/0222526 A1 * 9/2010 Oikawa et al. ................ 526/60
2010/0330497 A1 12/2010 Ichikawa et al.

FOREIGN PATENT DOCUMENTS

JP 06-266099 A1 9/1994
JP 2001-002735 A1 1/2001
JP 2011-028231 A1 2/2011

* cited by examiner

Primary Examiner — Ling Choi
Assistant Examiner — David L Miller
(74) Attorney, Agent, or Firm — Burr & Brown, PLLC

(57) ABSTRACT

A method for producing a resist copolymer having a weight-average molecular weight of not less than 3000 and not more than 6000, in which copolymer the contents of an oligomer having a molecular weight of not more than 1000 and a byproduct derived from a polymerization initiator are small, is provided.

The method for producing a resist copolymer comprises the step of continuously supplying a solution containing a monomer and a solution containing a polymerization initiator to a heated solvent to carry out a radical polymerization, wherein the variation range of the concentration of the polymerization initiator in polymerization solution is within ±25% of the median value between the maximum concentration and the minimum concentration during specific time; and the variation range of the concentration of unreacted monomer in the polymerization solution is within ±35% of the median value between the maximum concentration and the minimum concentration during specific time.

4 Claims, 6 Drawing Sheets

METHOD FOR PRODUCING RESIST COPOLYMER HAVING LOW MOLECULAR WEIGHT

FIELD OF THE INVENTION

The present invention relates to a method for producing a resist copolymer used for producing semiconductors. More particularly, the present invention relates to a method for producing a resist copolymer having a weight-average molecular weight within the range of not less than 3000 and not more than 6000.

BACKGROUND OF THE INVENTION

In lithography used for production of a semiconductor, formation of a finer pattern is increasingly demanded due to increase in the integration density, and, at present, lithography techniques with KrF excimer laser light (with a wavelength of 248 nm) or ArF excimer laser light (with a wavelength of 193 nm) are used for mass production. Further, research and development are in progress also for lithography techniques using F2 excimer laser light, which has a shorter wavelength (a wavelength of 157 nm), EUV (extreme ultraviolet) and X-ray, which have still shorter wavelengths than those excimer lasers, and the electron beam.

With the progress of miniaturization of patterns as described above, a copolymer having a lower molecular weight has been increasingly used in recent years as a base component for resist used in lithography. This is because a copolymer having a smaller molecular size is thought to be preferably used in order to improve resolution and Line Edge Roughness (LER) (Patent Document 1). Actually, as for a copolymer used for ArF excimer laser, a copolymer having a weight-average molecular weight (hereinafter referred to as Mw) of about 10000 is mainly used for pattern size of not more than 90 nm, whereas a copolymer having a Mw of about 7000 has been increasingly used for pattern size of not more than 45 nm. Although a copolymer having a low molecular weight may have an undesired performance such as decrease in coating property, decrease in etching resistance, film loss at the time of immersion exposure or the like, it is thought that a most-advanced resist copolymer will tend to have a lower molecular weight in the future.

In these situations, a method for producing a copolymer having a low molecular weight, specifically a copolymer having a Mw of from 3000 to 6000 is not established. A most common method for producing a practically applied resist copolymer is the method in which several kinds of monomers are copolymerized in the form of solution under heat with a radical polymerization initiator such as an azo compound or the like to obtain a copolymer. In such a case, for reducing a molecular weight of a copolymer, a method in which the amount of used polymerization initiator is increased; a method in which polymerization is carried out in the presence of a sulfur compound or the like as a molecular weight modifier having a chain transfer effect, or the like is known (Patent Document 2).

PRIOR ART REFERENCES

Patent Documents

[Patent Document 1] Japanese Laid-open Patent Application (Kokai) No. 06-266099
[Patent Document 2] Japanese Laid-open Patent Application (Kokai) No. 2001-2735
[Patent Document 3] Japanese Laid-open Patent Application (Kokai) No. 2011-28231

FIELD OF THE INVENTION

Problems to be Solved by the Invention

The present inventors studied the above-described background art to discover that when a large amount of radical polymerization initiator is supplied to carry out a polymerization under the condition of high radical concentration, the generated radical ends immediately undergo a termination reaction before a chain growth reaction of a polymer well proceeds, and the amount of generated unintended products, i.e. an oligomer having a molecular weight of not more than 1000, and a byproduct formed by recombination between radicals derived from the polymerization initiator are increased. Here, a copolymer having a molecular weight of not more than 1000, which copolymer is thought to be generated by combining about 2 to 5 monomers, is referred to as an oligomer. In cases where a large amount of oligomers are contained in a copolymer having a low molecular weight used as a base component for resist, undesired phenomena may be caused as follows.

Firstly, a large amount of homooligomers composed of the same repeating unit are contained in an oligomer having small chain numbers, and such homooligomers have a low solubility in a resist solvent to form insoluble substances, which may cause defects in resist. For example, the case where 3 monomers of A, B and C components are copolymerized at a molar composition ratio of 50/30/20 will now be considered. Since monomers are randomly polymerized in principle, the ratio of homotrimers AAA, BBB and CCC generated by polymerizing the 3 monomers is expected as follows respectively: the cube of 0.5 is 0.125, the cube of 0.3 is 0.027, and the cube of 0.2 is 0.008. The total ratio of generated homotrimers is estimated to be as much as 0.125+0.027+0.008=0.16 (16%). As for hexamers generated by using the same molar composition ratio, the total ratio of the hexamers is 0.0164 (1.6%) according to the same calculation as described above, so that the ratio of the homopolymer is one digit smaller.

Secondary, there is a concern that the transmittance of a resist may decrease and oxidation degradation thereof may occur due to increase in the numbers of molecular chain ends. A small amount of carbon-carbon double bonds derived from disproportionation termination reaction exist at the ends of a polymer obtained by radical polymerization. The carbon-carbon double bonds absorb deep-ultraviolet (193 nm and the like) used for lithography and cause the decrease in the transmittance. Further, the carbon-carbon double bonds are subjected to oxidation, thereby promoting the deterioration of resin.

Thirdly, as shown in the first and second reasons, since there is a concern that an oligomer may adversely affect a resist, the oligomer has to be removed by purification. However, if the purification is carried out excessively in order to remove the oligomer adequately, a copolymer having a relatively low molecular weight required originally is also removed by the purification, and a copolymer having a desired molecular weight distribution may not be obtained. Furthermore, if the content of the oligomer is simply large, the yield of the copolymer with respect to a feedstock decreases, which causes increase in production cost. From the above-described reasons, a method for producing a copolymer in which the amount of generated oligomer is small at the completion of the polymerization reaction is desired.

Patent Document 3 reports a resist composition in which the content of an acrylate copolymer having a Mw of not less than 2500 and less than 5000 is not less than 50% by weight of the total resin, and a method for producing the same, which are not sufficient to solve the above-described problems.

Accordingly, an object of the present invention is to provide a method for producing a resist copolymer having a weight-average molecular weight of not less than 3000 and not more than 6000, in which copolymer the amount of generated oligomer having a molecular weight of not more than 1000 is small.

Means for Solving the Problems

The present inventors intensively studied in order to solve the above-described problems to discover that in a method for producing a resist copolymer having a weight-average molecular weight of not less than 3000 and not more than 6000, by reducing the variation of the concentration of a polymerization initiator in polymerization reaction solution and the variation of the concentration of a monomer in the polymerization reaction solution, the polymerization initiator can be acted efficiently, the amount of the used polymerization initiator can be decreased, and a copolymer in which the amount of a generated oligomer or a byproduct derived from the polymerization initiator is small can be produced, thereby completing the present invention.

That is, according to an aspect of the present invention, a method for producing a resist copolymer having a weight-average molecular weight of not less than 3000 and not more than 6000, the method comprising the step of continuously supplying a solution containing a monomer and a solution containing a polymerization initiator to a heated solvent to carry out a radical polymerization, wherein the variation range of the concentration of the polymerization initiator in polymerization solution is within ±25% of the median value between the maximum concentration and the minimum concentration during the time from the point where the amount of the supplied monomer reaches to 10% by mole of the total amount of the monomer to supply to the point where the supply of monomer solution is completed; and the variation range of the concentration of an unreacted monomer in the polymerization solution is within ±35% of the median value between the maximum concentration and the minimum concentration during the time from the point where the amount of the supplied monomer reaches to 10% by mole of the total amount of the monomer to supply to the point where the supply of monomer solution is completed, is provided.

SUMMARY OF THE INVENTION

According to the present invention, the copolymer having a weight-average molecular weight of not less than 3000 and not more than 6000, in which the copolymer having superior resist property with suppressed the generation of the oligomer having a molecular weight of not more than 1000, can be produced.

DETAILED DESCRIPTION OF THE INVENTION

Figure 1:
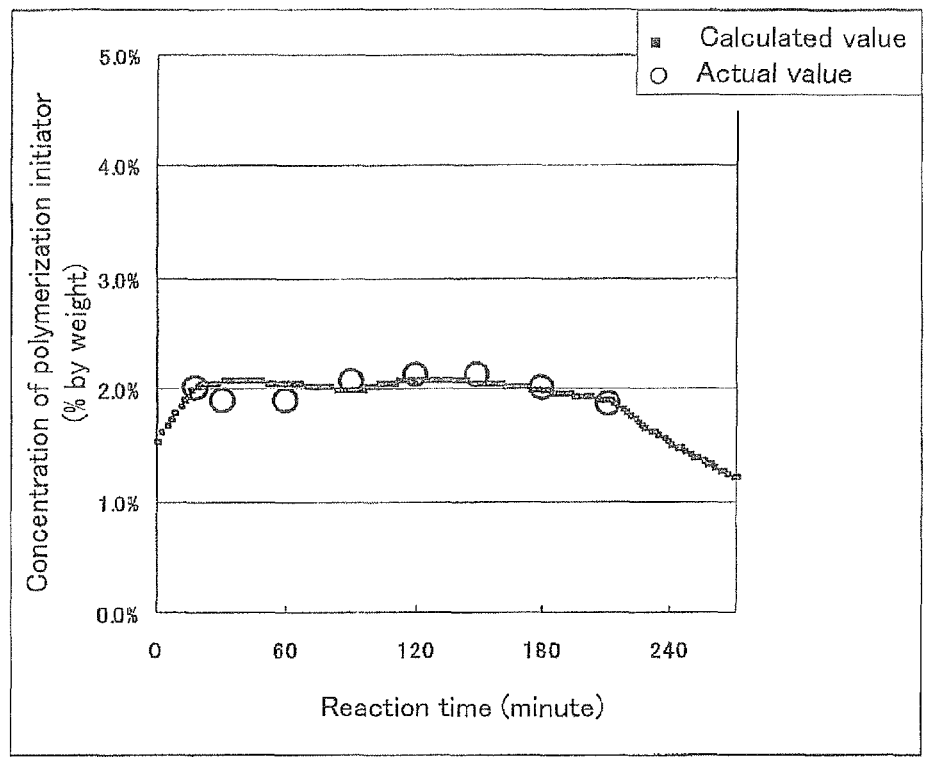
FIG. 1 shows change in the concentration of the polymerization initiator with time in polymerization reaction in Example 1.

Although embodiments of the present invention will now be described, the present invention is not restricted to the following embodiments, and it should be understood that embodiments made by modifying, improving or the like the following embodiments properly without departing from the object of the present invention, based on ordinary knowledge of those skilled in the art, are also within the scope of the present invention.

Copolymer

The resist copolymer produced according to the present invention has a weight-average molecular weight of not less than 3000 and not more than 6000, preferably not less than 4000 and not more than 6000, and preferably has a molecular weight distribution (Mw/Mn) of 1.2 to 2.5, more preferably 1.3 to 2.0. Further, the copolymer preferably contains an oligomer having a molecular weight of not more than 1000 in an amount of not more than 10%, more preferably not more than 5% of the total at the completion of the polymerization reaction. The copolymer obtained after purification preferably contains an oligomer having a molecular weight of not more than 1000 in an amount of not more than 4% of the total. As long as the weight-average molecular weight, molecular weight distribution (Mw/Mn) and oligomer content of the copolymer is around the above-described range, any copolymer can be suitably used in lithography in which fine patterns are formed.

Structure of Copolymer

The resist copolymer produced according to the present invention is a polymer which is made soluble in an alkaline developer by the action of an acid, and which copolymer comprises at least one repeating unit (A) having a structure in which an alkali-soluble group is protected with an acid-dissociable dissolution-inhibitive group. The acid-dissociable dissolution-inhibitive group is a group which inhibits dissolution of the copolymer in the alkaline developer, and which is dissociated by the action of an acid to dissolve the copolymer in the alkaline developer. The resist copolymer produced according to the present invention comprises a repeating unit (B) having a lactone ring structure, and/or a repeating unit (C) having a hydroxyl group. In addition, the resist copolymer of the present invention may comprise the other repeating units including a repeating unit (D) having a structure which inhibits dissolution in the alkaline developer, and which is stable for the action of an acid (this structure is hereinafter referred to also as "acid-stable and dissolution inhibiting structure"), as necessary.

Repeating Unit (A)

The repeating unit (A) is a repeating unit having a structure in which an alkali-soluble group such as a carboxyl group, a phenolic hydroxyl group, a sulfonic group or the like is protected with the acid-dissociable dissolution-inhibitive group which is dissociated by the action of an acid. The repeating unit (A) is preferably a repeating unit in which a carboxyl group or a phenolic hydroxyl group in a repeating unit derived from (meth)acrylic acid, hydroxystyrene or the like, or OH group in a sulfonic group or the like is protected with the acid-dissociable dissolution-inhibitive group.

Examples of the acid-dissociable dissolution-inhibitive group include a structure represented by the formula (a1) or (a2).

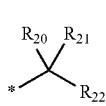
(a1)

In Formula (a1), * represents the position of linkage of Formula (a1) itself; $R_{20}$ and $R_{21}$ each independently represents a $C_1$-$C_4$ hydrocarbon group, and specific examples of each of $R_{20}$ and $R_{21}$ include $C_1$-$C_4$ alkyl such as methyl, ethyl, n-propyl, i-propyl, n-butyl and i-butyl. $R_{22}$ represents a $C_1$-$C_{12}$ hydrocarbon group, and specific examples of $R_{22}$ include $C_1$-$C_{12}$ linear, branched or cyclic alkyl such as methyl, ethyl, n-propyl, i-propyl, n-butyl, i-butyl, cyclopentyl, cyclohexyl, norbornyl, tricyclo[5.2.1.0$^{2,6}$]decanyl, adamantyl and tetracyclo[4.4.0.1$^{2,5}$.1$^{7,10}$]dodecanyl; and $C_6$-$C_{12}$ aryl such as phenyl and naphthyl. $R_{22}$ may be linked to $R_{20}$ or $R_{21}$ to form a ring, more particularly, a $C_5$-$C_{12}$ alicyclic ring such as a cyclopentane ring, cyclohexane ring, norbornane ring, tricyclo[5.2.1.0$^{2,6}$]decane ring, adamantane ring or tetracyclo[4.4.0.1$^{2,5}$.1$^{7,10}$]dodecane ring. Especially in cases where $R_{22}$ comprises, or in cases where $R_{22}$ is linked to $R_{20}$ or $R_{21}$ to form, a saturated alicyclic ring, more particularly, a cyclopentane ring, cyclohexane ring, norbornane ring, tricyclo[5.2.1.0$^{2,6}$]decane ring, adamantane ring or tetracyclo[4.4.0.1$^{2,5}$.1$^{7,10}$]dodecane ring, the solubilities to an alkaline developer before and after lithography are largely different from each other, which is preferred for drawing a fine pattern.

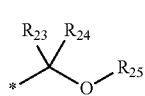
(a2)

In Formula (a2), * represents the position of linkage of Formula (a2) itself; $R_{23}$ and $R_{24}$ each independently represents a hydrogen atom or $C_1$-$C_4$ hydrocarbon group, and specific examples of each of $R_{23}$ and $R_{24}$ include a hydrogen atom; and $C_1$-$C_4$ alkyl such as methyl, ethyl, n-propyl, i-propyl, n-butyl and i-butyl. $R_{25}$ represents a $C_1$-$C_{12}$ hydrocarbon group, and specific examples thereof include $C_1$-$C_{12}$ linear, branched or cyclic alkyl such as methyl, ethyl, n-propyl, i-propyl, n-butyl, butyl, t-butyl, 2-ethylhexyl, cyclopentyl, cyclohexyl, norbornyl, tricyclo[5.2.1.0$^{2,6}$]decanyl, adamantyl and tetracyclo[4.4.0.1$^{2,5}$.1$^{7,10}$]dodecanyl. $R_{23}$ may be linked to $R_{24}$ or $R_{25}$ to form a ring. Specific examples of the ring formed by linking of $R_{23}$ to $R_{24}$ include a cyclopentane ring, cyclohexane ring, norbornane ring, tricyclo[5.2.1.0$^{2,6}$]decane ring, adamantane ring or tetracyclo[4.4.0.1$^{2,5}$.1$^{7,10}$]dodecane ring, and specific examples of the ring formed by linking of $R_{23}$ to $R_{25}$ include a hydrofuran ring and hydropyran ring.

Specific examples of the repeating unit (A) are described below, but these examples do not limit the present invention. One type or a plurality of types having different structures may be selected from the examples of the repeating unit (A).

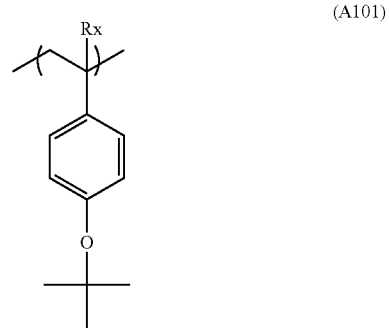
(A101)

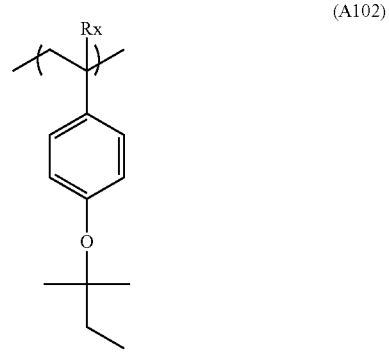
(A102)

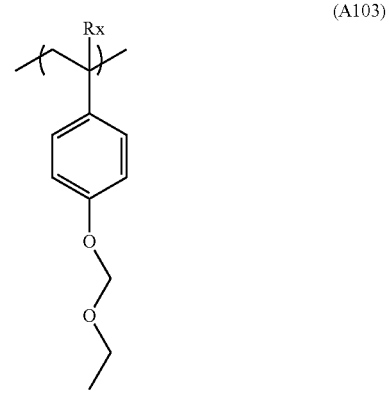
(A103)

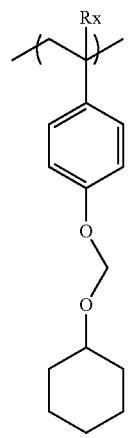
(A104)
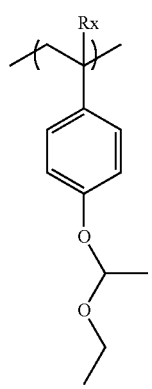
(A105)
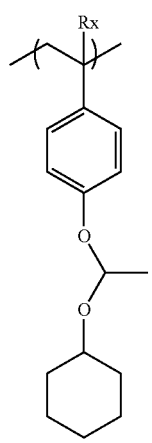
(A106)
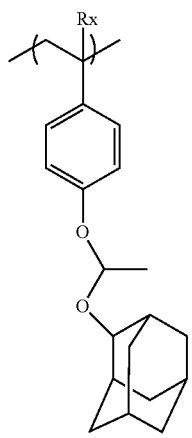
(A107)
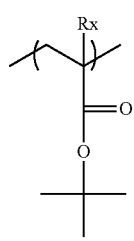
(A201)
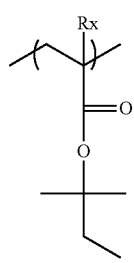
(A202)
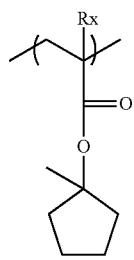
(A203)
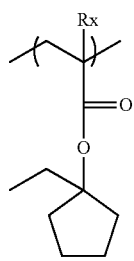
(A204)

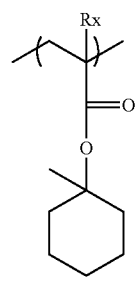 (A205)
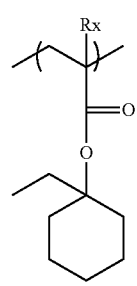 (A206)
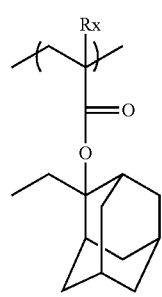 (A207)
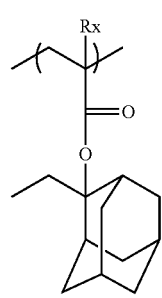 (A208)
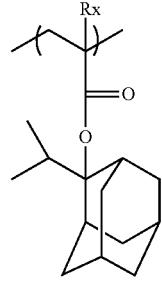 (A209)
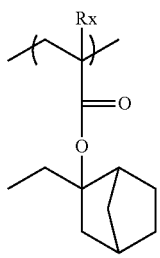 (A210)
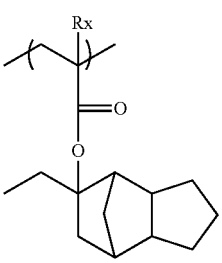 (A211)
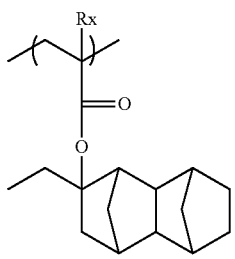 (A212)
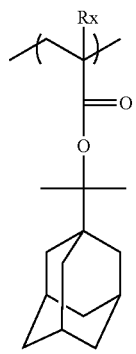 (A213)
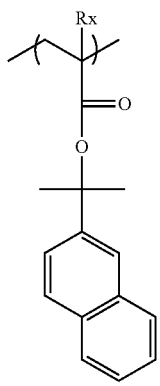 (A214)
Wherein Rx represents H, CH₃ or CF₃.

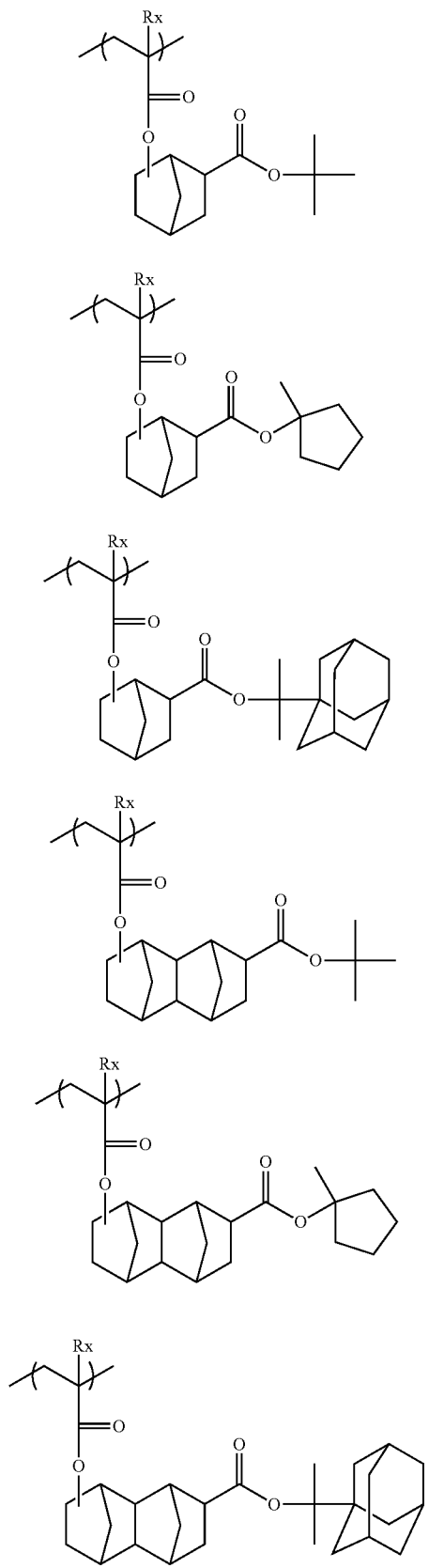
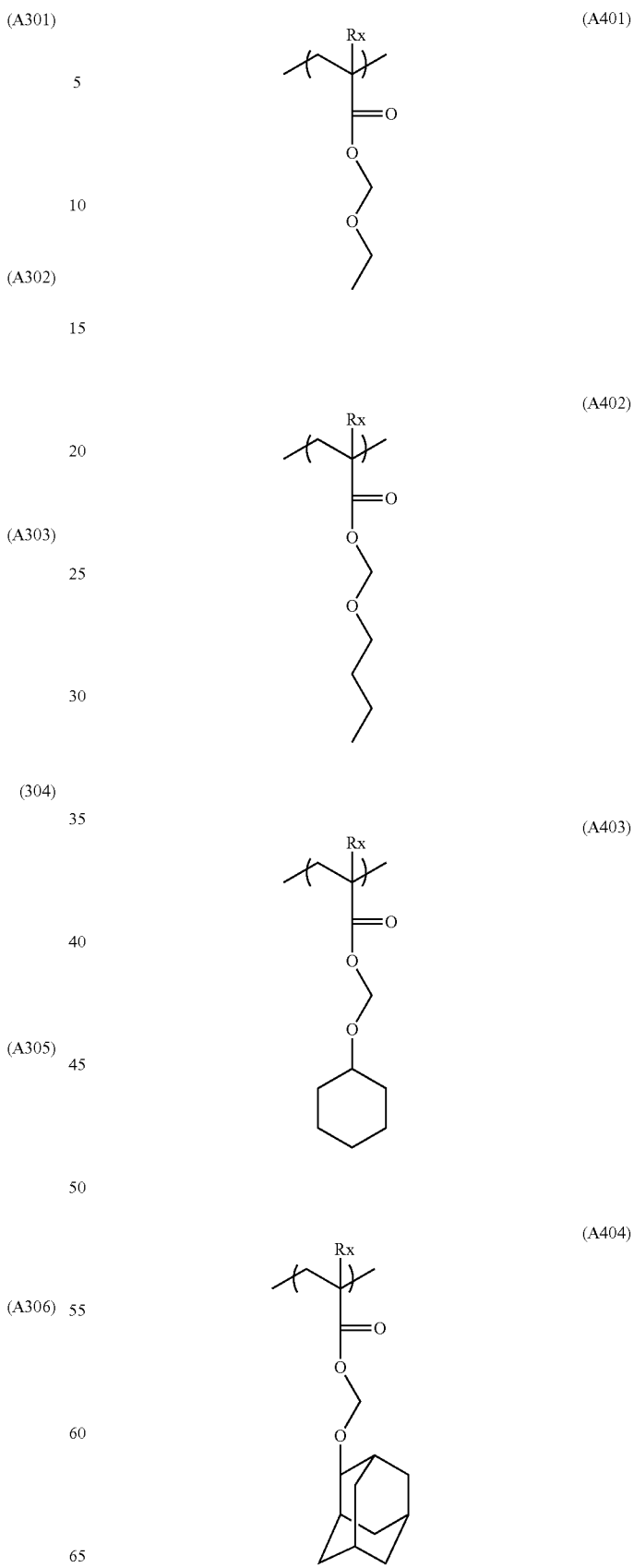

(A405) 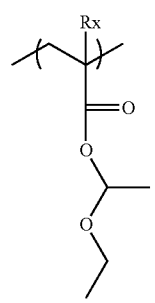
(A406) 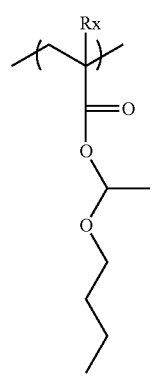
(A407) 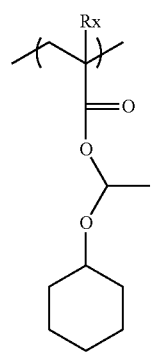
(A408) 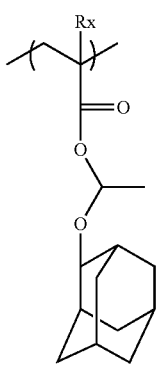
(A409) 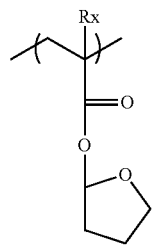
(A410) 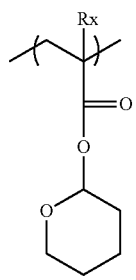
(A411) 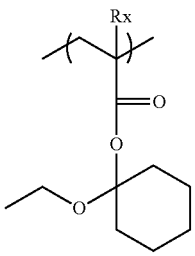
(A412) 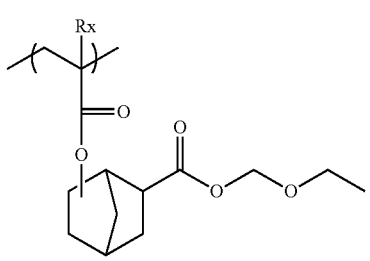
(A413) 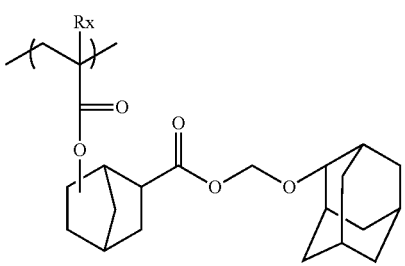
(A414) 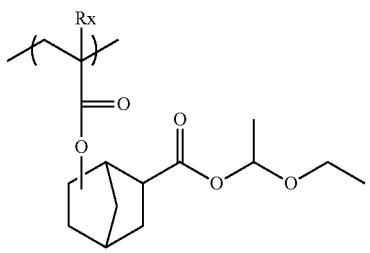
(A415) 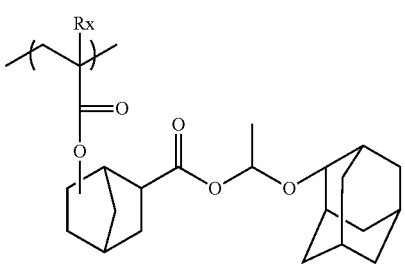

-continued

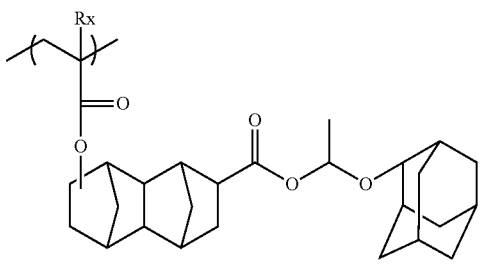

(A416)

Wherein Rx represents H, CH$_3$ or CF$_3$.

Repeating Unit (B)

The repeating unit (B) is a repeating unit having a lactone structure, and enhances adhesion of the polymer to a substrate or bed layer, and controls the solubility to a lithography solvent or alkaline developer. Preferred examples of the repeating unit (B) include structures represented by Formula (B1).

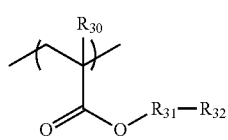

(B1)

In Formula (B1), R$_{30}$ represents a hydrogen atom, or C$_1$-C$_4$ hydrocarbon group which may be substituted with a fluorine atom(s), and specific examples of R$_{30}$ include a hydrogen atom, and C$_1$-C$_4$ alkyl such as methyl, ethyl, n-propyl, i-propyl, n-butyl, i-butyl and trifluoromethyl. R$_{30}$ is preferably a hydrogen atom, methyl or trifluoromethyl. R$_{31}$ represents a single bond or divalent linking group. The divalent linking group may be C$_1$-C$_4$ alkylene or a group in which the alkylene is substituted with an oxygen atom(s), carbonyl and/or carbonyloxy. R$_{32}$ is a lactone structure-containing group represented by Formula (b).

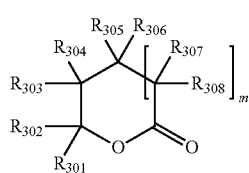

(b)

In Formula (b), any one of R$_{301}$ to R$_{308}$ represents a single bond which is the position of linkage of R$_{32}$ itself, and each of the remaining R$_{301}$ to R$_{308}$ represents a hydrogen atom, C$_1$-C$_4$ hydrocarbon group or alkoxy; or any one of R$_{301}$ to R$_{308}$ represents a C$_3$-C$_{14}$ hydrocarbon group that comprises the position of linkage of R$_{32}$ itself and is linked to any one or two of the other R$_{301}$ to R$_{308}$ to form a C$_5$-C$_{15}$ alicyclic ring, which C$_3$-C$_{14}$ hydrocarbon group may comprise an oxygen atom and/or sulfur atom, each of any one or two of the remaining R$_{301}$ to R$_{308}$ represents a single bond for formation of the C$_5$-C$_{15}$ alicyclic ring, and each of the other R$_{301}$ to R$_{308}$ represents a hydrogen atom, C$_1$-C$_4$ hydrocarbon group or alkoxy. m represents an integer of 0 or 1.

Specific examples of the above alicyclic ring include a cyclopentane ring, cyclohexane ring, norbornane ring, 7-oxa-norbornane ring, 7-thia-norbornane ring and tetracyclo [4.4.0.1$^{2,5}$.1$^{7,10}$]dodecane ring, and the alicyclic ring is preferably a norbornane ring or 7-oxa-norbornane ring. Specific examples of the C$_1$-C$_4$ hydrocarbon group include methyl, ethyl, n-propyl, i-propyl, n-butyl and i-butyl, and specific examples of the C$_1$-C$_4$ alkoxy include methoxy and ethoxy.

In Formula (c), especially preferred examples of the lactone structure wherein any one of R$_{301}$ to R$_{308}$ represents a single bond having the position of linkage of R$_{32}$ itself and each of the remaining R$_{301}$ to R$_{308}$ represents a hydrogen atom, C$_1$-C$_4$ hydrocarbon group or alkoxy include the γ-butyrolactone structure and δ-valerolactone structure. Especially preferred examples of the lactone structure wherein any one of R$_{301}$ to R$_{308}$ represents a C$_3$-C$_{14}$ hydrocarbon group that comprises the position of linkage of R$_{32}$ itself and is bound to any one or two of the other R$_{301}$ to R$_{308}$ to form a C$_5$-C$_{15}$ alicyclic ring, which C$_3$-C$_{14}$ hydrocarbon group may comprise an oxygen atom and/or sulfur atom, and each of the other R$_{301}$ to R$_{308}$ represents a hydrogen atom, C$_1$-C$_4$ hydrocarbon group or alkoxy include the 1,3-cyclohexanecarbolactone structure, 2,6-norbornanecarbolactone structure, 7-oxa-2,6-norbornanecarbolactone structure and 4-oxa-tricyclo [5.2.1.0$^{2,6}$]decane-3-one structure.

Specific examples of the repeating unit (B) are described below, but these examples do not limit the present invention. One type, or a plurality of types having different structures may be selected from the examples of the repeating unit (B).

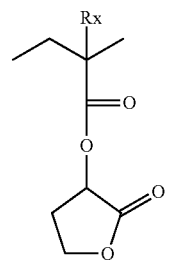

(B101)

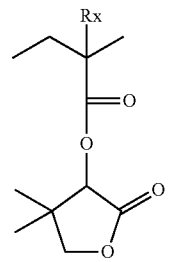

(B102)

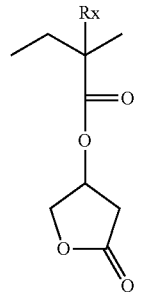

(B103)

(B104) 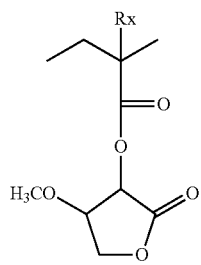
(B105) 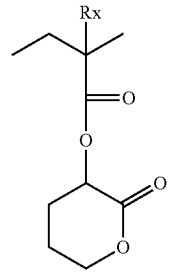
(B106) 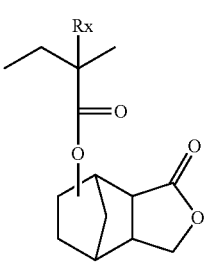
(B107) 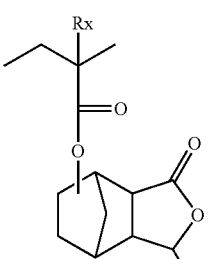
(B108) 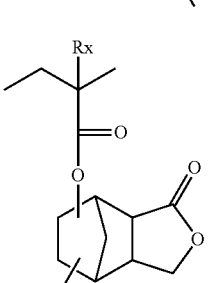
(B109) 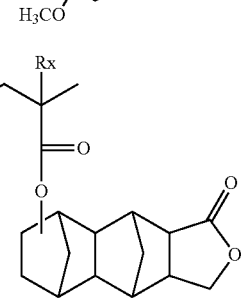
(B110) 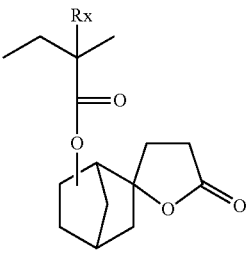
(B111) 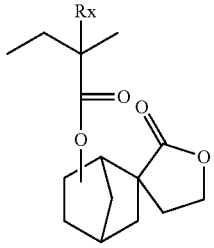
(B112) 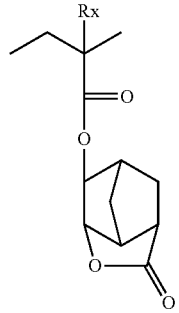
(B113) 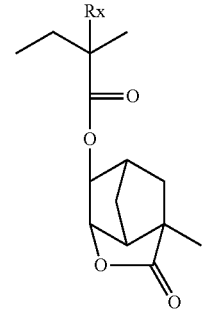
(B114) 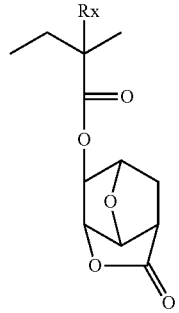

-continued

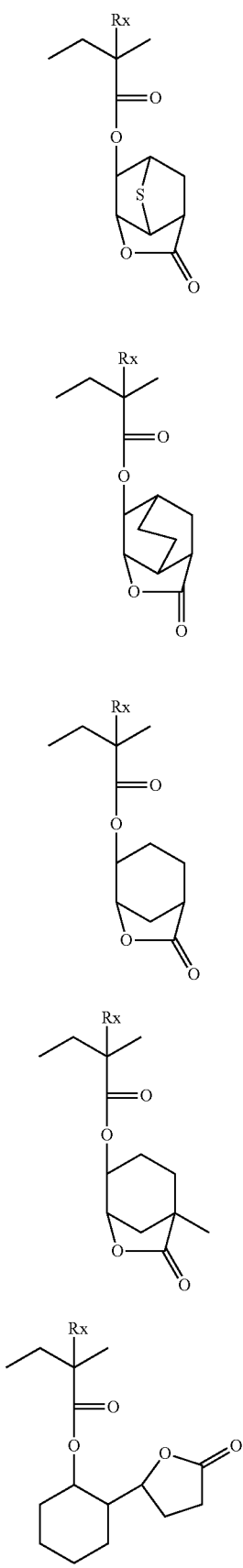
(B115)
(B116)
(B117)
(B118)
(B119)

-continued

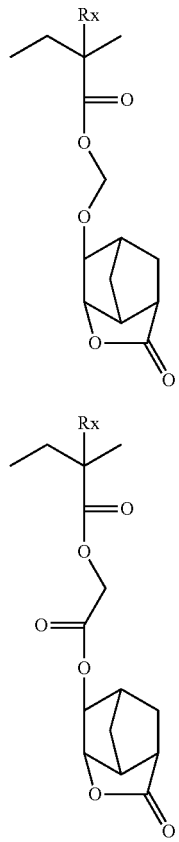
(B201)
(B202)

Wherein Rx represents H, CH$_3$ or CF$_3$.

Repeating Unit (C)

The repeating unit (C) has a hydroxy group or carboxy group in its side chain, and enhances adhesion of the polymer to a substrate or bed layer, controls the solubility to a lithography solvent or alkaline developer, and/or gives a function to react with a curing agent to form a cross-linking structure.

As the structure of the repeating unit (C), the structures represented by Formulae (C1) to (C3) are especially preferred.

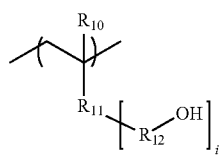
(C1)

In Formula (C1), R$_{10}$ represents a hydrogen atom, or C$_1$-C$_4$ hydrocarbon group which may be substituted with a fluorine atom(s), and specific examples of R$_{10}$ include a hydrogen atom; and C$_1$-C$_4$ alkyl which may be substituted with a fluorine atom(s), such as methyl, ethyl, n-propyl, i-propyl, n-butyl, i-butyl and trifluoromethyl. R$_{10}$ is preferably a hydrogen atom, methyl or trifluoromethyl. R$_{12}$ represents a substituted or unsubstituted aromatic hydrocarbon group. R$_{12}$ represents a single bond, or C$_1$-C$_4$ divalent hydrocarbon group which may be substituted with a fluorine atom(s), or carbonyl, and specific examples of R$_{12}$ include a single bond, and C$_1$-C$_4$ alkylene which may be substituted with a fluorine atom(s), such as methylene, 1,1-ethylene, 2,2-propylene, 1,1,1,3,3,3-hexafluoro-2,2-propylene and 1,1,1-trifluoro-2-trifluoromethyl-2,3-propylene. $R_{12}$ is preferably a single bond, 1,1,1,3,3,3-hexafluoro-2,2-propylene or 1,1,1-trifluoro-2-trifluoromethyl-2,3-propylene, and a single bond is especially preferred. i represents an integer of 1 or 2.

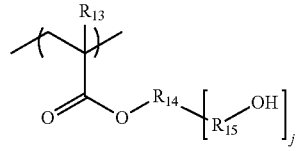
(C2)

In Formula (C2), $R_{13}$ represents a hydrogen atom, or $C_1$-$C_4$ hydrocarbon group which may be substituted with a fluorine atom(s), and specific examples of $R_{13}$ include a hydrogen atom; and $C_1$-$C_4$ alkyl which may be substituted with a fluorine atom(s), such as methyl, ethyl, n-propyl, i-propyl, n-butyl, i-butyl and trifluoromethyl. $R_{13}$ is preferably a hydrogen atom, methyl or trifluoromethyl. $R_{14}$ represents a $C_2$-$C_{14}$ divalent to tetravalent hydrocarbon group which may comprise a fluorine atom, oxygen atom and/or sulfur atom, and specific examples of $R_{14}$ include $C_2$-$C_4$ linear or branched saturated hydrocarbon groups such as ethylene and isopropylene; and $C_5$-$C_{14}$ saturated alicyclic hydrocarbon groups having a cyclohexane ring, norbornane ring, 7-oxa-norbornane ring, 7-thia-norbornane ring, adamantane ring or tetracyclo[4.4.0.1$^{2,5}$.1$^{7,10}$]dodecane ring, which may comprise an oxygen atom and/or sulfur atom. The cyclohexane ring, norbornane ring and adamantane ring are preferred. $R_{15}$ represents a single bond, or $C_1$-$C_4$ divalent hydrocarbon group which may be substituted with a fluorine atom(s), and specific examples of $R_{15}$ include a single bond and $C_1$-$C_4$ alkylene which may be substituted with a fluorine atom(s), such as methylene, 1,1-ethylene, 2,2-propylene, 1,1,1,3,3,3-hexafluoro-2,2-propylene and 1,1,1-trifluoro-2-trifluoromethyl-2,3-Propylene. $R_{15}$ is preferably a single bond, 1,1,1,3,3,3-hexafluoro-2,2-propylene or 1,1,1-trifluoro-2-trifluoromethyl-2,3-propylene. The combination wherein $R_{14}$ is adamantyl and $R_{15}$ is a single bond is especially preferred. j represents an integer of 1 to 3.

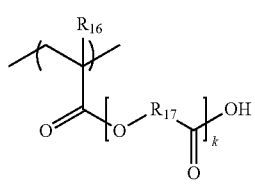
(C3)

In Formula (C3), $R_{16}$ represents a hydrogen atom, or $C_1$-$C_4$ hydrocarbon group which may be substituted with a fluorine atom(s), and specific examples of $R_{16}$ include a hydrogen atom; and $C_1$-$C_4$ alkyl which may be substituted with a fluorine atom(s), such as methyl, ethyl, n-propyl, i-propyl, n-butyl, i-butyl and trifluoromethyl. $R_{16}$ is preferably a hydrogen atom, methyl or trifluoromethyl. $R_{17}$ represents a $C_6$-$C_{12}$ divalent alicyclic hydrocarbon group which may comprise an oxygen atom and/or sulfur atom, and specific examples of $R_{17}$ include alicyclic hydrocarbon groups having a norbornane ring, 7-oxa-norbornane ring, 7-thia-norbornane ring, tetracyclo[4.4.0.1$^{2,5}$.1$^{7,10}$]dodecane ring and/or the like, which may comprise an oxygen atom and/or sulfur atom. The norbornane ring and tetracyclo[4.4.0.1$^{2,5}$.1$^{7,10}$]dodecane ring are preferred. k represents an integer of 0 or 1.

Specific examples of the repeating unit (C) are described below, but these examples do not limit the present invention. One type, or a plurality of types having different structures may be selected from the examples of the repeating unit (C).

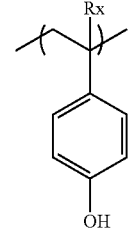
(C101)

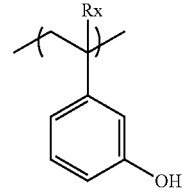
(C102)

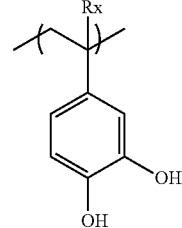
(C103)

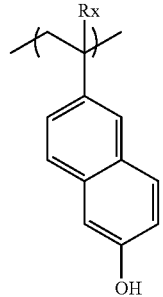
(C104)

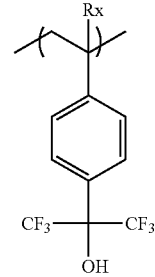
(C105)

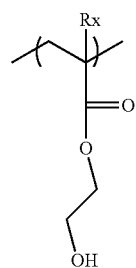
(C201)
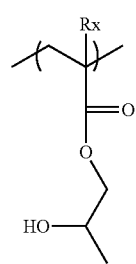
(C202)
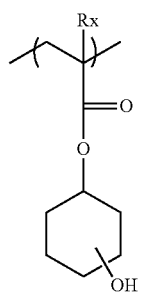
(C203)
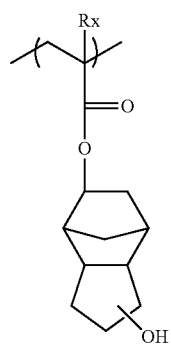
(C204)
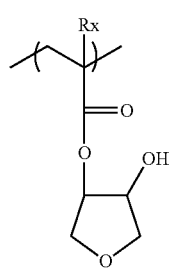
(C205)
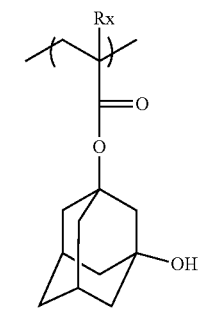
(C206)
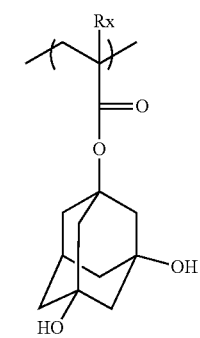
(C207)
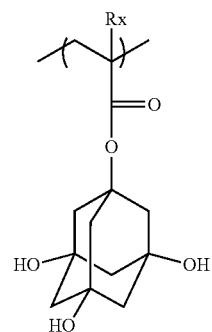
(C208)
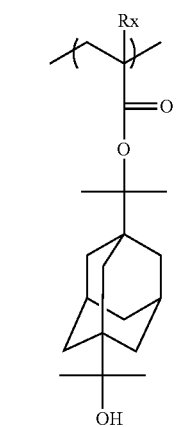
(C209)

(C210)

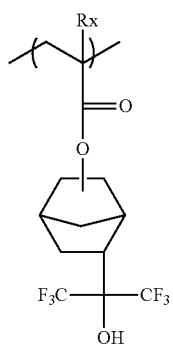

(C211)

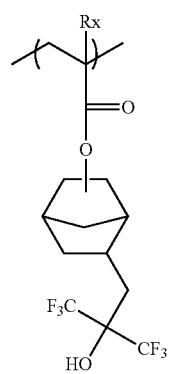

(C301)

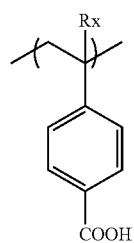

(C302)

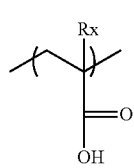

(C303)

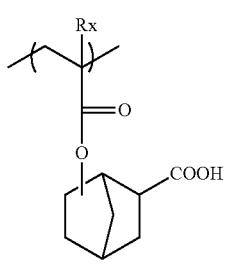

(C304)

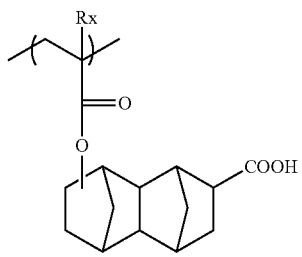

Wherein Rx represents H, $CH_3$ or $CF_3$.

Repeating Unit (D)

The repeating unit (D) is a repeating unit having a structure in which an alkali-soluble group such as a carboxyl group, phenolic hydroxyl group or the like is protected with the acid-stable and dissolution inhibiting group which is not dissociated by the action of an acid. The repeating unit (D) is preferably a repeating unit in which a carboxyl group or a phenolic hydroxyl group in a repeating unit derived from (meth)acrylic acid, hydroxystyrene or the like is protected with the acid-stable and dissolution inhibiting group. The repeating unit provides the action to control the solubility in a lithography solvent or an alkaline developer, optical properties such as refractive index and light transmittance of thin film, and the like.

Examples of the acid-stable, dissolution inhibiting group include a $C_1$-$C_{12}$ aliphatic hydrocarbon group wherein the carbon which substitutes the hydrogen atom of the carboxyl group or phenolic hydroxyl group and is linked to the oxygen atom is a primary or secondary carbon; aromatic hydrocarbon group; and structures wherein methyl and/or 1-adamantyl is/are linked. Specific examples of the acid-stable, dissolution inhibiting group include methyl, ethyl, n-propyl, i-propyl, n-butyl, i-butyl, cyclopentyl, cyclohexyl, 2-norbornyl, 2-isobornyl, 8-tricyclo[$5.2.1.0^{2,6}$] decanyl, 1-adamantyl, 2-adamantyl, 4-tetracyclo[$4.4.0.1^{2,5}.1^{7,1}$]dodecanyl, phenyl, benzyl, naphthyl and anthracenyl.

Although specific examples of the repeating unit (D) will now be described as follows, the present invention is not restricted thereto. One or a plurality of kinds of different structures can be selected among the repeating units (D) and used.

[formula 12]

(D101)

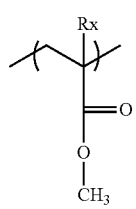

(D102) 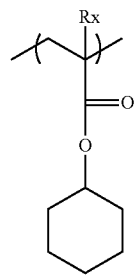

(D103) 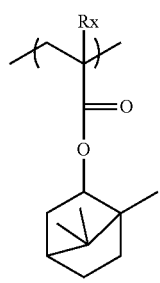

(D104) 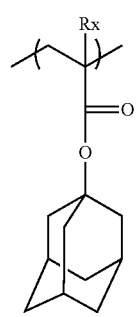

(D105) 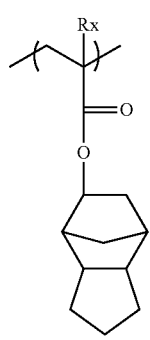

(D106) 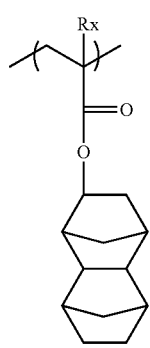

(D107) 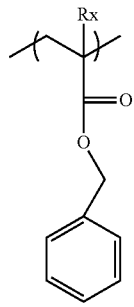

(D108) 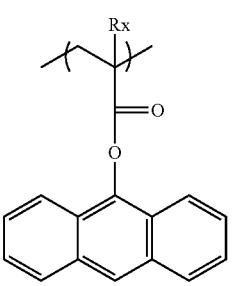

(D109) 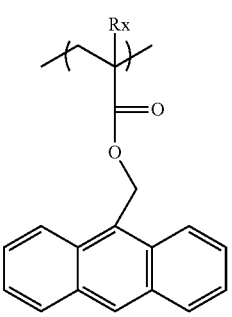

(wherein Rx is H, $CH_3$ or $CF_3$)

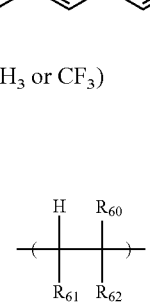 (D')

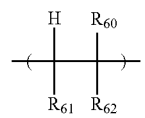

In Formula (D'), $R_{60}$ represents a hydrogen atom, or $C_1$-$C_4$ hydrocarbon group which may be substituted with a fluorine atom(s), and specific examples of $R_{60}$ include a hydrogen atom; and $C_1$-$C_4$ alkyl which may be substituted with a fluorine atom(s), such as methyl, ethyl, n-propyl, i-propyl, n-butyl, i-butyl and trifluoromethyl. $R_{60}$ is preferably a hydrogen atom, methyl or trifluoromethyl. $R_{61}$ represents a hydrogen atom, or a single bond or $C_1$-$C_4$ alkylene linked to $R_{62}$, and specific examples of $R_{61}$ include a hydrogen atom, single bond, methylene, ethylene and isopropylene. $R_{62}$ is a $C_6$-$C_{14}$ aromatic hydrocarbon group, and specific examples of $R_{62}$ include a benzene ring, naphthalene ring and anthracene ring.

Specific examples of the repeating unit (D') will now be described as follows:

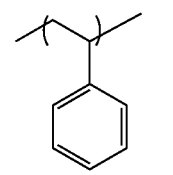
(D'101)

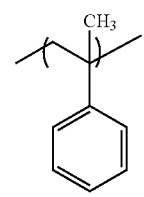
(D'102)

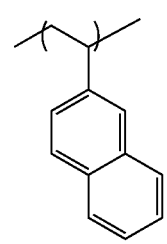
(D'203)

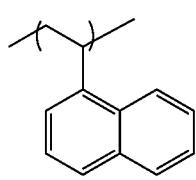
(D'204)

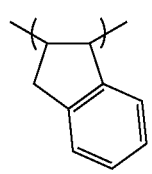
(D'205)

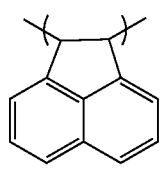
(D'206)

As for the composition of each repeating unit when used for a chemically-amplified positive resist film, the content of the repeating unit (A) is selected from the range of 5 to 80% by mole, preferably 10 to 70% by mole, more preferably 15 to 60% by mole. The total content of the repeating unit (B) and the repeating unit (C) is selected from the range of 20 to 95% by mole, preferably 30 to 90% by mole, more preferably 40 to 85% by mole, and the content of the repeating unit (D) or (D') is selected from the range of 0 to 50% by mole, preferably 0 to 40% by mole, more preferably 0 to 30% by mole.

Polymerization Initiator

As the polymerization initiator to be used for production of a copolymer for semiconductor lithography, a known radical polymerization initiator may be used. Preferred examples of the polymerization initiator include radical polymerization initiators such as azo compounds and peroxides. Specific examples of azo compound-based polymerization initiators include 2,2'-azobisisobutyronitrile, 2,2% azobis(2-methylbutyronitrile), dimethyl 2,2'-azobis(2-methylpropionate), 1,1'-azobis(cyclohexane-1-carbonitrile) and 4,4'-azobis(4-cyanovaleric acid). Specific examples of peroxide-based polymerization initiators include decanoyl peroxide, lauroyl peroxide, benzoyl peroxide, bis(3,5,5-trimethylhexanoyl) peroxide, succinic acid peroxide, tert-butylperoxy-2-ethylhexanoate, tert-butylperoxy pivalate and 1,1,3,3-tetramethylbutylperoxy-2-ethylhexanoate. These may be used either alone or as a mixture. An azo compound-based polymerization initiator is preferred since it is excellent in safety in handling. However, some azo polymerization initiators contain a large amount of metallic impurities, which may adversely affect resist performances and the like. In such a case, it is desired that the metallic impurities are preliminarily removed by extracting a solution obtained by dissolving the polymerization initiator in an organic solvent or the like with water solvent, or by contacting the solution with an ion exchange resin or a filter having a function to capture the metal.

Polymerization Step

The polymerization step of the present invention is the step of continuously supplying a solution containing a monomer which provides the above-described repeating unit in a copolymer and a solution containing a polymerization initiator to a heated solvent to carry out a radical polymerization. The polymerization step is carried out by determining the supply rate of the polymerization initiator and the monomer according to the method described below, and by controlling the concentration of the polymerization initiator and the concentration of the unreacted monomer in polymerization reaction.

In the polymerization step, the variation range of the concentration of the polymerization initiator in polymerization solution is within ±25%, preferably within ±20%, more preferably within ±10% of the median value between the maximum concentration and the minimum concentration during the time from the point where the amount of the supplied monomer reaches to 10% by mole of the total amount of the monomer to supply to the point where the supply of monomer solution is completed; and the variation range of the concentration of unreacted monomer in the polymerization solution is within ±35%, preferably within ±30% of the median value between the maximum concentration and the minimum concentration during the time. By controlling the variation range of the concentration of the polymerization initiator and the variation range of the concentration of the unreacted monomer in polymerization solution, the polymerization initiator can be acted efficiently, and the copolymer having a weight-average molecular weight of not less than 3000 and not more than 6000 can be produced with a smaller amount of the used polymerization initiator. By this, the amounts of a generated by product derived from the polymerization initiator and oligomer having a molecular weight of not more than 1000 can be reduced.

In the polymerization step, a part of the polymerization initiator, for example 1 to 12% by mass of the total amount of supplied polymerization initiator, is preferably supplied to the polymerization tank before the monomer solution is supplied. By supplying a part of the polymerization initiator preliminarily, the production of a copolymer having a higher molecular weight than the aimed one at the early stage of the polymerization reaction can be prevented, and further, the variation range of the concentration of the polymerization initiator in the polymerization solution during polymerization reaction can be maintained within a small range.

In the polymerization step, the ratio of the total mole numbers of the supplied polymerization initiator to the total mole numbers of the supplied monomer is preferably not more than 10% by mole, more preferably not more than 8% by mole. By controlling the ratio of the total mole numbers of the supplied polymerization initiator to the total mole numbers of the supplied monomer within around the above-described range, the amounts of the generated by product derived from the polymerization initiator and the oligomer having a molecular weight of not more than 1000 can be reduced.

Preparation of Dropping Solution

Although the monomer and the polymerization initiator which per se are in the form of liquid can be supplied as they are without being dissolved in a solvent, these are preferably supplied after being dissolved in a solvent. At that time, the concentrations thereof are preferably selected such that the viscosity ranges are acceptable for supply procedure, and that each monomer and polymerization initiator are dissolved well, not precipitated during the supply, and are easy to diffuse in polymerization system. Specific concentration thereof varies depending on a combination of a solute and a solvent in each solution or the like, and usually dropping solution is prepared such that the total concentration of all monomers or the concentration of the polymerization initiator is, for example, 5 to 60% by mass, preferably 10 to 50% by mass respectively.

Method for Determining Supply Rate of Polymerization Initiator

The supply rate of the polymerization initiator is determined such that the variation range of the concentration of the polymerization initiator in polymerization solution is within ±25% of the median value during the time from the point where the amount of the supplied monomer is 10% to the point where the supply is completed, by simulating how the concentration of the polymerization initiator changes in reaction system based on a general method of calculation of half life.

Simulation is specifically carried out according to the following procedures (1) to (3) assuming the case where only a solvent is placed in a reaction vessel, and after heating the solvent to polymerization temperature, a solution containing a part of the polymerization initiator is preliminarily supplied to the reaction vessel, and then a solution containing the monomer and a solution containing the residual polymerization initiator are supplied dropwise.

(1) Change in the Amount of the Polymerization Initiator in the Reaction System is Calculated.

Taking the amount of the polymerization initiator supplied before the supply of the monomer begins as JO (g), the half-life of the polymerization initiator at polymerization temperature as T (minute), and the supply rate of the polymerization initiator as K (g/minute), the residual amount of the polymerization initiator in reaction system after heating for 1 minute is represented by $JO \times \exp(-\ln 2/T)$.

Since the polymerization initiator added afterward is heated for 0.5 minutes on average during the supply over 1 minute, the amount of additively supplied polymerization initiator for 1 minute is represented by $K \times \exp(-\ln 2 \times 0.5/T)$. Therefore, the residual amount J1 of the polymerization initiator after 1 minute is represented by $J1 = JO \times \exp(-\ln 2/T) + K \times \exp(-\ln 2 \times 0.5/T)$. The residual amount J2 of the polymerization initiator after 2 minutes is also represented by $J2 = J1 \times \exp(-\ln 2/T) + K \times \exp(-\ln 2 \times 0.5/T)$. By using the same calculation repeatedly thereafter, the residual amount of the polymerization initiator in reaction system after the prescribed time passed can be calculated.

The value of the half life T of the polymerization initiator required for the calculation can be known by referring to documents such as manufacturer's catalogue and the like. Since the decomposition rate of the polymerization initiator may vary depending on the kinds of the solvent, it is more preferred in order to obtain the more accurate value that the polymerization initiator is dissolved in the prescribed solvent, and the resulting mixture is heated at the prescribed temperature to carry out an experiment to measure change in concentration thereof, thereby obtaining the half life T.

(2) Change in Fluid Volume in the Reaction Vessel is Calculated.

Taking the amount of the solvent placed in the reaction vessel initially as LO–1 (g), the amount of polymerization initiator solution supplied before the supply of the monomer as LO–2 (g), the supply rate of the polymerization initiator solution as M (g/minute), and the supply rate of the monomer solution as N (g/minute), the fluid volume L1 in the reaction vessel after 1 minute is represented by $L1 = (LO–1) + (LO–2) + M + N$, and the fluid volume L2 in the reaction vessel after 2 minutes is represented by $L2 = L1 + M + N$.

Thereafter, the fluid volume after the prescribed time passed can be calculated in the same way.

(3) Concentration of the Polymerization Initiator in the Polymerization Solution is Calculated.

Based on the calculation results of (1) and (2), the concentration I1 of the polymerization initiator in the polymerization solution after 1 minute is represented by $I1 = J1/L1$.

The concentration I2 of the polymerization initiator in the polymerization solution after 2 minutes is represented by $I2 = J2/L2$. Thereafter, the concentration of the polymerization initiator in the polymerization solution after the prescribed time passed can be calculated in the same way.

Subsequently, a graph is made by taking the time along the abscissa and taking the concentration of the polymerization initiator in the polymerization solution along the ordinate, and the supply rate is simulated such that the change in the concentration of the polymerization initiator in polymerization solution is within ±25% of the median value between the maximum concentration and the minimum concentration during the time from the point where the amount of the supplied monomer is 10% by mole of the total amount of the monomer to supply to the point where the supply is completed. By making a graph, the situation of change in the concentration of the polymerization initiator can be confirmed visually. The aforementioned calculation can be easily carried out by using a spreadsheet of personal computer.

Method for Determining Supply Rate of Monomer Solution

The supply rate of the monomer to reduce the variation range of the concentration of the monomer, according to the present invention can be determined by carrying out the following preliminary experiment.

First, only a solvent is placed in a reaction vessel, and after heating the solvent to the reaction temperature, a solution containing the monomer and a solution containing the polymerization initiator are supplied at a constant rate respectively to synthesize a copolymer, and aliquots of polymerization solution are sampled at regular time intervals to quantify the concentration of the unreacted monomer in the polymerization solution. The unreacted monomer is quantified according to the adequate analysis such as gas chromatography, liquid chromatography, gel permeation chromatography or the like. The relationship between the concentration of the unreacted monomer and the reaction time is plotted to make a graph, and the maximum value B (% by weight) of the concentration of the unreacted monomer during the time from the point where the amount of the supplied monomer is 10% by mole of the total amount of the monomer to supply to the point where the supply is completed, the amount of supplied monomer solution C (g) at that time, and the median value A (% by weight) between the maximum value and the minimum value during the time are obtained.

Based on each value A, B and C obtained in the above-described preliminary experiment, the supply rate of the monomer solution of the present invention is determined as follows:

(i) only a solvent is placed in the reaction vessel, and after heating the solvent to the polymerization temperature, a part of the polymerization initiator is preliminarily supplied;

(ii) until the concentration of the monomer in the polymerization solution exceeds A (%), the monomer solution is supplied at a standard rate, i.e. the same constant rate as that in the preliminary experiment;

(iii) thereafter, the supply rate of the monomer solution is reduced to, usually, A/B times the rate in (ii); and (iv) if the amount of supplied monomer solution reaches to C (g), the supply rate of the monomer solution is returned to the same rate as that in (ii).

The solvent to be used in the polymerization reaction is not restricted as long as the solvent can stably dissolve raw material monomers, obtained copolymer, polymerization initiator and chain transfer agent. Specific examples of the polymerization solvent include water; ketones such as acetone, methyl ethyl ketone, methyl isobutyl ketone, methyl isoamyl ketone, methyl amyl ketone and cyclohexanone; alcohols such as methanol, ethanol and isopropanol; ether alcohols such as ethylene glycol monomethyl ether, ethylene glycol monoethyl ether, propylene glycol monomethyl ether and propylene glycol monoethyl ether; esters such as methyl acetate, ethyl acetate, isopropyl acetate, propyl acetate, butyl acetate, methyl propionate, methyl lactate and ethyl lactate; ether esters such as ethylene glycol monomethyl ether acetate, ethylene glycol monoethyl ether acetate, propylene glycol monomethyl ether acetate and propylene glycol monoethyl ether acetate; ethers such as tetrahydrofuran, 1,4-dioxane and ethylene glycol dimethyl ether; aromatic hydrocarbons such as toluene and xylene; N,N-dimethylformamide; and acetonitrile. In views of the solubilities of the monomers, polymerization initiator, chain transfer agent and copolymer, and of the boiling point, acetone, methyl ethyl ketone, methyl isobutyl ketone, isopropanol, propylene glycol monomethyl ether, methyl acetate, ethyl acetate, isopropyl acetate, propyl acetate, methyl propionate, tetrahydrofuran, 1,4-dioxane, ethylene glycol dimethyl ether, toluene and acetonitrile are preferred. These may be used either alone or as a mixture of two or more thereof. Further, these may be used as a mixture with a compound in which the monomers, polymerization initiator, chain transfer agent and copolymer are highly soluble and which has a high boiling point. Examples of the compound include ethylene glycol monobutyl ether, 3-methoxy-3-methyl-1-butanol, 3-methoxy-3-methyl-1-butyl acetate, 3-ethoxy ethyl propionate, γ-butyrolactone, diethylene glycol dimethyl ether, N-methylpyrrolidone and dimethyl sulfoxide.

The amount of the polymerization solvent to be used is not restricted, and in cases where the amount of the solvent used is too small, monomers may be precipitated and/or the viscosity of the solution is too high to keep the polymerization system uniform. In cases where the amount of the solvent used is too large, there are cases where the degree of conversion of the monomers is insufficient and/or the molecular weight of the copolymer cannot be increased to the desired value. The amount of the polymerization solvent to be used is normally 0.5 to 20 parts by weight, preferably 1 to 10 parts by weight with respect to 1 part by weight of monomers.

The amount of the polymerization solvent to be initially filled in the reaction vessel (which may be hereinafter referred to as the initially filled solvent) is sufficient as long as the amount is not less than the lowest amount at which the resulting solution can be stirred, while in cases where the amount is unnecessarily large, the amount of the monomer solution which can be supplied is small and hence the production efficiency is low, which is not preferred. The amount of the initially filled solvent is usually selected within the range of, for example, not less than 1/30, preferably 1/20 to 1/2, especially preferably 1/10 to 1/3, in terms of the volume ratio with respect to the final filled amount (that is, the total amount of the initially filled solvent, and the monomer solution and the initiator solution to be dropped). A part of the monomers may be preliminarily mixed with the initially filled solvent.

When the dropping time is short, molecular weight distribution is likely to be broad, and the temperature of the polymerization solution is reduced due to dropping of a large amount of the solution at one time, which is not preferred. On the contrary, when the dropping time is long, the copolymer is subjected to an excessive thermal history and productivity is reduced, which is not preferred. Therefore, the dropping time is ordinary selected from the range of 0.5 to 24 hours, preferably 1 to 12 hours, especially preferably 2 to 8 hours.

After completion of dropwise addition, it is preferable that the residual unreacted monomer be reacted by carrying out aging by maintaining the temperature for a certain period of time, by further heating or the like. When the aging time is too long, production efficiency per hour is decreased, and the copolymer is subjected to an excessive thermal history, which is not preferred. Therefore, the aging time is ordinary selected from the range of not more than 12 hours, preferably not more than 6 hours, especially preferably 1 to 4 hours.

The polymerization temperature may be appropriately selected based on the boiling points of the solvent, monomers, chain transfer agent and the like; the half-life temperature of the polymerization initiator; and the like. At a low temperature, the polymerization hardly proceeds and hence there is the problem of productivity, while at an unnecessarily high temperature, there are problems in view of the stability of the monomers and the copolymer. Therefore, the polymerization temperature is preferably selected within the range of 40 to 160° C., especially preferably 60 to 120° C. Since the polymerization temperature largely influences the molecular weight of the copolymer and the copolymer composition, the temperature should be precisely controlled. On the other hand, the polymerization reaction is generally an exothermic reaction and hence the polymerization temperature tends to increase, so that it is difficult to keep the temperature constant. Thus, preferably, one or more types of compounds having boiling points close to the polymerization temperature of interest are included as a polymerization solvent(s) and the polymerization temperature is set to not less than the initial boiling points of the compounds. By this method, increase in the polymerization temperature can be suppressed by the latent heat of vaporization of the polymerization solvent(s).

When the cold monomer solution is added dropwise to the polymerization system, the situation of low temperature, high monomer concentration, and low radical concentration occurs locally and high polymer may be generated, which is not preferred. Therefore, the monomer solution is preferably heated preliminarily to be supplied.

Examples of the method for heating the monomer solution preliminarily include a method for warming the monomer solution with a heat exchanger and the like just before supplying to a storage tank or the polymerization system. The temperature of the preliminary heating is preferably not less than 25° C., and more preferably not less than 30° C. However, in cases where the monomer solution is heated preliminarily in the storage tank, the monomer solution is maintained under heating condition for a long time, so that a high polymer may be generated at high temperature. Therefore, in case of the preliminarily heating in the storage tank, the temperature is preferably not more than 50° C., more preferably not more than 40° C. Although the initiator solution can also be heated preliminarily, when the temperature is too high, the polymerization initiator decomposes before the supply thereof, so that the temperature is usually not more than 40° C., preferably not more than 30° C., more preferably not more than 25° C.

The polymerization pressure may be appropriately set, but, since nitrogen gas in the case of the azo system or oxygen gas in the case of the peroxide system is generated when radicals are generated from the initiator, the polymerization is preferably performed under a pressure near atmospheric pressure by setting the polymerization system to be an open system, in order to suppress fluctuation of the polymerization pressure.

As for a chain transfer agent, one known as a chain transfer agent can be used as necessary. Among them, a thiol compound is preferable and can be widely selected from known thiol compounds. Specific examples thereof include t-dodecylmercaptan, mercaptoethanol, mercaptoacetic acid and mercaptopropionic acid. A thiol compound having a structure in which a 2-hydroxy-1,1,1,3,3,3-hexafluoro-2-propyl group is bound to a saturated aliphatic hydrocarbon is especially preferable, since it has an effect to suppress roughness or defect of lithography patterns. The amount of the used chain transfer agent can be selected depending on the intended molecular weight, the kinds of the monomer, polymerization initiator, chain transfer agent, solvent and the like, compositions of the repeating units, the polymerization temperature, dropping rate or the like.

Polymerization Reactor

In the method for producing a polymer for semiconductor lithography of the present invention, a polymerization reactor which is conventionally known can be used. The polymerization reactor comprises at least a storage tank of a solution containing the monomer as a raw material, a storage tank of a solution containing the polymerization initiator, and a polymerization reaction vessel.

Purification Step

The copolymer obtained by polymerization contains low molecular weight impurities such as the polymerization solvent, unreacted monomers, oligomers, polymerization initiator and chain transfer agent, and their reaction by-products, and these are preferably removed by the purification step. More particularly, the removal is carried out by diluting as required the polymerization reaction solution by addition of a good solvent and bringing the solution into contact with a poor solvent to precipitate the copolymer as a solid, to extract impurities into the poor solvent phase (hereinafter referred to as reprecipitation), or carried out by forming a liquid-liquid two-phase to extract impurities into the poor solvent phase. In cases where reprecipitation was carried out, further purification is possible by a step wherein the precipitated solid is separated from the poor solvent by a method such as filtration or decantation and then redissolved in a good solvent, followed by reprecipitation by further addition of a poor solvent, or by a step wherein the precipitated solid is washed with a poor solvent. In cases where the liquid-liquid two-phase separation was carried out, further purification is possible by removing the poor solvent phase by separation, adding a poor solvent to the obtained copolymer solution, and then performing reprecipitation or liquid-liquid two-phase separation. In terms of these operations, the same operation may be repeated, or different operations may be performed in combination.

Examples of the poor solvent used in this purification step include compounds having a hydroxyl group, such as water, ethanol, isopropanol, ethylene glycol and ethyl lactate; linear, branched or cyclic saturated hydrocarbons such as pentane, n-hexane, iso-hexane, n-heptane, cyclopentane and ethylcyclohexane; and aromatic hydrocarbons such as toluene and xylene. These solvents may be used either alone or as a combination of two or more of these solvents. Examples of the good solvent include the above-described polymerization solvents and the solvents exemplified for the later-described solvent for film formation. A mixture of a good solvent(s) and a poor solvent(s) may also be used.

The type and the amount of the poor solvent used in the purification step are not restricted as long as the copolymer can be separated from low molecular weight compounds, and may be appropriately selected depending on the solubility of the copolymer to the poor solvent, the type and the amount of the solvent used for polymerization, the type and the amount of impurities, and the like. In cases where the amount of the poor solvent is small, separation of impurities such as the polymerization solvent and unreacted monomers is insufficient, while use of a large amount of the poor solvent is not preferred in views of ease of handling and the cost since, for example, waste fluid increases. In general, the amount of the poor solvent is 0.5 to 50 times, preferably 1 to 20 times, more preferably 2 to 10 times the total amount of the polymerization reaction solution after dilution of a good solvent as required, in terms of the weight.

Since the temperature during the purification step largely influences the weight average molecular weight and the molecular weight distribution of the copolymer; removal rates of the residual monomers, residual initiator and the like; various properties in lithography; and the like; the temperature needs to be strictly controlled. In cases where the temperature during the purification step is too low, the solubilities of impurities to the reprecipitation solvent and washing solvent are insufficient and hence and removal of impurities cannot be achieved sufficiently, resulting in inefficiency. On the other hand, in cases where the temperature is too high, the copolymer is eluted into the reprecipitation solvent and the washing solvent, leading to an unbalanced composition in the low molecular weight region of the copolymer and/or a low yield, which is not preferred. Thus, the purification step is preferably carried out at a temperature within the range of 0 to 40° C., preferably within the range of 0 to 30° C.

The thus purified copolymer may be dried and recovered as powder, or may be redissolved by addition of a good solvent before or after the drying, to be recovered as a solution. Examples of the good solvent used in the redissolving include the above-described polymerization solvents and the solvents exemplified for the later-described solvent for film formation.

After the purification, the solvent of the copolymer solution may be replaced with a solvent for film formation, which is suitable for the later-described lithography composition. The substitution is carried out by heating the copolymer solution under reduced pressure to evaporate low boiling point substances such as the solvent used for purification, and supplying a solvent for film formation to the resulting solution while evaporating the initial solvent and the supplied solvent at the same time. By removing low boiling point impurities such as the solvent used for purification, the copolymer can be prepared into a solution for film formation.

The temperature during the heating under reduced pressure is not restricted as long as the copolymer is not deteriorated at the temperature, and, usually, the temperature is preferably not more than 100° C., more preferably not more than 80° C., still more preferably not more than 70° C., especially preferably not more than 60° C.

In the replacement of the solvent, in cases where the amount of the solvent for film coating supplied later is too small, low boiling point compounds cannot be sufficiently removed, and in cases where the amount is too large, the substitution takes a long time and the thermal history of the copolymer is unnecessarily long, which is not preferred. The amount of the solvent to be supplied may be selected within the range of 1.05 to 10 times, preferably 1.1 to 5 times, especially preferably 1.2 to 3 times the necessary amount of the solvent for the finished solution.

The solvent for film formation is not restricted as long as the solvent can dissolve the copolymer, and usually selected in consideration of the boiling point, influences on the coating films of the semiconductor substrate and the like, and absorbance of the radiation used for lithography. Examples of solvents commonly used for film formation include propylene glycol monomethyl ether acetate, propylene glycol monomethyl ether, propylene glycol n-butyl ether, dipropylene glycol n-propyl ether, dipropylene glycol n-butyl ether, ethyl lactate, methyl amyl ketone, γ-butyrolactone, cyclohexanone and 4-methyl-2-pentanol.

Further, the step of removal of metal impurities from the copolymer is preferably performed. In this step, the copolymer solution is allowed to pass through a filter having cation-exchange capacity or a filter comprising a substance having a positive zeta potential, such as polyamide polyamine epichlorohydrin cationic resin. These steps may be carried out in combination.

Specific examples of the filter comprising a substance having a positive zeta potential, such as polyamide polyamine epichlorohydrin cationic resin, include Zeta Plus 40 QSH, Zeta Plus 020 GN and LifeASSURE EF Series (registered trademarks) manufactured by CUNO INC.

Further, in order to remove microgels such as high polymers, which may cause pattern defects of resists and hence are not preferred, the copolymer solution (or the solution for film formation) is preferably filtered through a filter. The filtration accuracy of the filter is not more than 0.2 μm, preferably not more than 0.1 μm, especially preferably not more than 0.05 μm. Examples of the material of the filter include polyolefins such as polyethylene and polypropylene, polar group-containing resins such as polyamide, polyester and polyacrylonitrile; and fluorine-containing resins such as polyethylene fluoride. The material of the filter is preferably polyamide. Examples of the polyamide filter include Ultipleat P-Nylon 66 and Ultipor N66 manufactured by Pall Corporation, and LifeASSURE PSN Series and LifeASSURE EF Series manufactured by CUNO INC (registered trademarks). Examples of the polyolefin filter include Microguard Plus HC10 and Optimizer D manufactured by Nihon Entegris K.K. These filters may be used either alone or as a combination of two or more of the filters.

EXAMPLES

Embodiments of the present invention will now be described more practically by way of Examples thereof. However, the present invention is not restricted at all to these Examples.

Used Monomer
M: 2-Methyl-2-adamantyl methacrylate
I: 2-Isopropyl-2-adamantyl methacrylate
Mp: 1-Methyl-1-cyclopentyl methacrylate
G: α-Methacryloxy-γ-butyrolactone
N: 3,5-Norbornanelactone-2-yl methacrylate
O: 3-Hydroxy-1-adamantyl methacrylate The concentration of the unreacted monomer and the concentration of the polymerization initiator in the polymerization solution were analyzed by the following high performance liquid chromatography. In 1 ml of tetrahydrofuran, 0.10 g of polymerization reaction solution was dissolved to prepare an analytical sample. The amount of the sample injected into the apparatus was 5

High Performance Chromatography
Apparatus: GPC8220 produced by TOSOH
Detector: Differential refractive index (RI) detector
Column: TSKgel Super HZ1000 produced by TOSOH (×4 columns)
Eluent: Tetrahydrofuran The weight-average molecular weight (Mw), molecular weight distribution (Mw/Mn), and oligomer content of the copolymer was obtained by the following gel permeation chromatography by using polystyrene as a standard. For analyzing the polymerization solution at the completion of the polymerization reaction, 0.10 g of polymerization solution was dissolved in 1 ml of tetrahydrofuran to prepare an analytical sample. The amount of the sample injected into the apparatus was 60 μl. For analyzing powders obtained after purification and drying of the polymerization solution, 0.02 g of the powders was dissolved in 1 ml of tetrahydrofuran to prepare an analytical sample. The amount of the sample injected into the apparatus was 60 μl. The oligomer content was expressed in terms of the area of the part having a Mw of not more than 1000, taking the total area of the part excluding the unreacted monomer, unreacted polymerization initiator, polymerization solvent and the like as 100 in the chromatogram of the polymerization products.

Gel Permeation. Chromatography
Apparatus: GPC8220 produced by TOSOH
Detector: Differential refractive index (RI) detector
Column: KF-804L produced by SHOWA DENKO (×3 columns)
Eluent: Tetrahydrofuran Copolymer compositions were analyzed by the following $^{13}$C-NMR. To a mixed solvent of 1.5 g of deuterated acetone and 0.5 g of methyl ethyl ketone, 1 g of the powders obtained after purification and drying of the polymerization solution and 0.1 g of Cr(III) acetylacetonate were dissolved to prepare an analytical sample.

$^{13}$C-NMR
Apparatus: AVANCE 400 produced by BRUKER
Nuclide: $^{13}$C
Measurement method: Inverse-gated-decoupling
Integration times: 6000 times
Measuring tube: 10 mmφ

Example 1

Production of G/Mp Copolymer 255 g of the monomer G and 252 g of the monomer Mp were dissolved in 360 g of methyl ethyl ketone to prepare a monomer dropping solution. Also, 55 g of dimethyl 2,2'-azobisisobutyrate (8.0% by mole with respect to the total amount of monomers) was dissolved in 167 g of methyl ethyl ketone to prepare an initiator dropping solution. To a 2 L four-necked flask reaction vessel made of glass equipped with a stirrer and a condenser, 338 g of methyl ethyl ketone was added, and after keeping the inside of the reaction vessel under nitrogen atmosphere, methyl ethyl ketone in the reaction vessel was heated to 79° C. The monomer dropping solution and the initiator dropping solution which were maintained at 25 to 30° C. were supplied dropwise respectively to the reaction vessel maintained at 79 to 81° C., over 210 minutes with metering pumps from separate storage tanks respectively while changing the supply rates described below.

First, 1/10 of the total amount of the initiator dropping solution was supplied to the reaction vessel at a time, which point was taken as 0 minutes of the reaction time. As for the supply program of the initiator dropping solution thereafter, 1/10 of the total amount was supplied dropwise from 0 to 20 minutes, 2/10 of the total amount was supplied dropwise from 20 to 90 minutes, and 6/10 of the total amount was supplied dropwise from 90 to 210 minutes. This supply program was equivalent to the supply rates of 1.11 g/minute, 0.63 g/minute and 1.11 g/minute, respectively. On the other hand, as for the supply program of the monomer dropping solution, 1/9 of the total amount was supplied dropwise from 0 to 20 minutes, 2/9 of the total amount was supplied dropwise from 20 to 90 minutes, and 6/9 of the total amount was supplied dropwise from 90 to 210 minutes. This supply program was equivalent to the supply rates of 4.82 g/minute, 2.75 g/minute and 4.82 g/minute respectively.

After completion of drop wise addition, the resulting mixture was further stirred for 1 hour while keeping the temperature to continue polymerization reaction and then cooled to room temperature. The cooled polymerization solution was added to n-hexane to precipitate a resin. The precipitated resin was filtered, then washed with a mixed solvent of n-hexane and methyl ethyl ketone, and dried under reduced pressure at 40° C.

Figure 2:
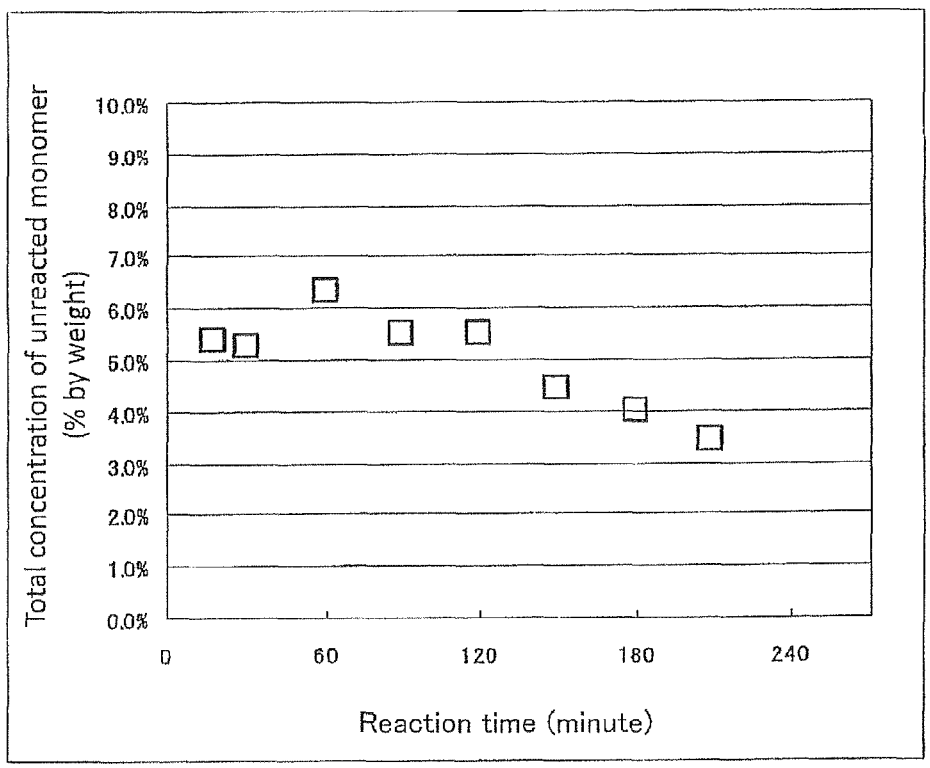
FIG. 2 shows change in the total concentration of the unreacted monomers with time in polymerization reaction in Example 1.

Aliquots of the polymerization solution were sampled from 0 minutes of the reaction time to the point where the dropwise addition of the dropping solution is completed, and the concentrations of the polymerization initiator and the concentrations of the unreacted monomer in the polymerization solution were analyzed by high performance liquid chromatography. The result of each analysis was shown in FIG. 1 and FIG. 2. The calculated values of the concentrations of the polymerization initiator calculated by the calculational procedure described in "Method for Determining Supply Rate of Polymerization Initiator" were also shown in FIG. 1. Further, a part of the polymerization solution at the completion of the polymerization reaction and a part of the resin obtained after purification and drying were sampled to obtain the molecular weight, molecular weight distribution (Mw/Mn) and oligomer content of the oligomer by GPC analysis, and copolymer composition ratio by NMR analysis. Results were shown in Table 1.

Comparative Example 1

Production of G/Mp Copolymer

The monomer G and the monomer Mp were used to prepare a monomer dropping solution in the same manner as in Example 1. Also, 69 g of dimethyl 2,2'-azobisisobutyrate (10.0% by mole with respect to the total amount of monomers) was dissolved in 151 g of methyl ethyl ketone to prepare an initiator dropping solution. To a 2 L four-necked flask reaction vessel made of glass equipped with a stirrer and a condenser, 360 g of methyl ethyl ketone was added, and after keeping the inside of the reaction vessel under nitrogen atmosphere, methyl ethyl ketone in the reaction vessel was heated to 79° C. The monomer dropping solution and the initiator dropping solution which were maintained at 25 to 30° C. were supplied dropwise respectively at a constant rate to the reaction vessel maintained at 79 to 81° C., over 180 minutes with metering pumps from separate storage tanks respectively.

Figure 3:
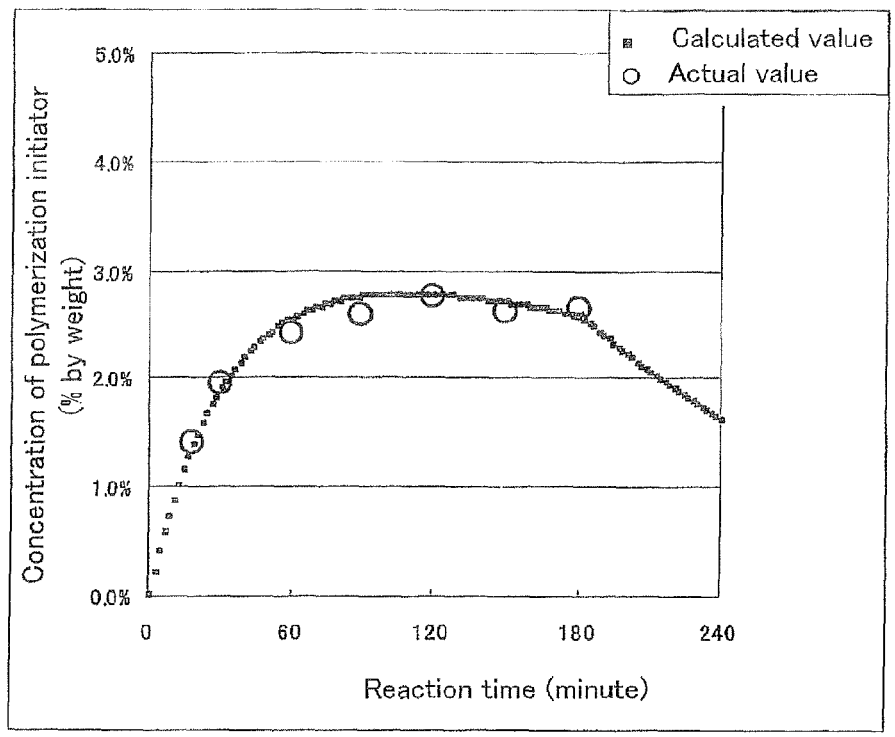
FIG. 3 shows change in the concentration of the polymerization initiator with time in polymerization reaction in Comparative Example 1.
Figure 4:
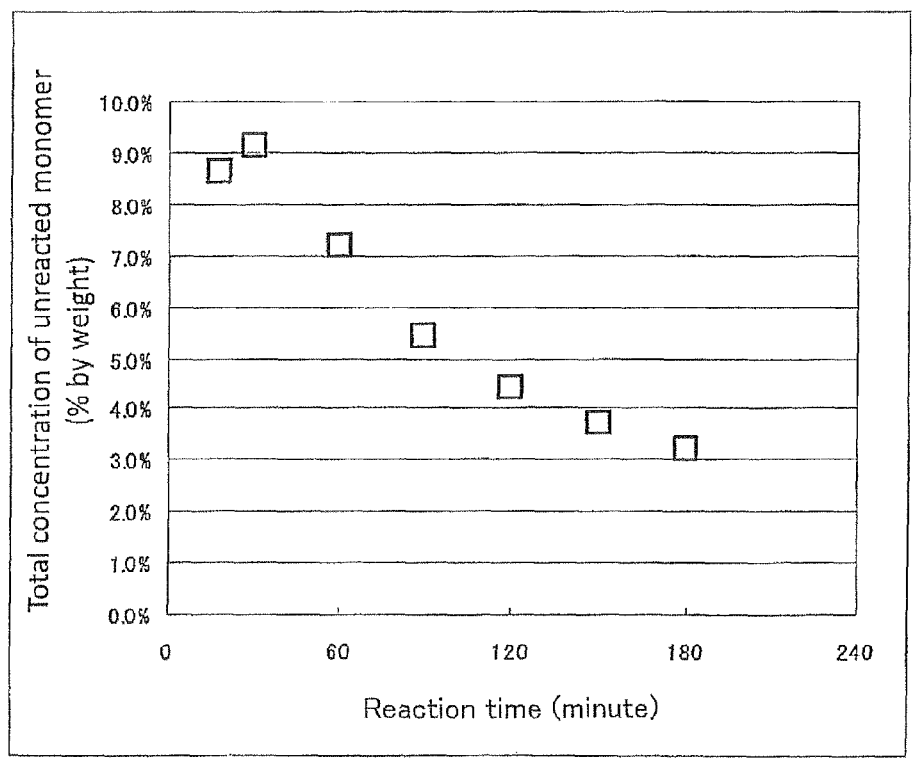
FIG. 4 shows change in the total concentration of the unreacted monomers with time in polymerization reaction in Comparative Example 1.

After completion of dropwise addition, the resulting mixture was further stirred for 1 hour while keeping the temperature to continue polymerization reaction, and then cooled to room temperature. The purification, drying step and analysis in each stage thereafter were carried out in the same manner as in Example 1. The analytical results of the concentration of the polymerization initiator and the concentration of the unreacted monomer in the polymerization reaction were shown in FIG. 3 and FIG. 4, and the analytical results of the copolymer were shown in Table 1. The calculated values of the concentrations of the polymerization initiator calculated by the calculational procedure described in "Method for Determining Supply Rate of Polymerization Initiator" were also shown in FIG. 3.

Example 2

Production of M/G/O Copolymer

In 378 g of methyl ethyl ketone, 201 g of the monomer M, 133 g of the monomer G and 85 g of the monomer O were dissolved to prepare a monomer dropping solution. Also, 39 g of dimethyl 2,2'-azobisisobutyrate (8.5% by mole with respect to the total amount of monomers) was dissolved in 121 g of methyl ethyl ketone to prepare an initiator dropping solution. To a 2 L four-necked flask reaction vessel made of glass equipped with a stirrer and a condenser, 240 g of methyl ethyl ketone was added, and after keeping the inside of the reaction vessel under nitrogen atmosphere, methyl ethyl ketone in the reaction vessel was heated to 79° C. The monomer dropping solution and the initiator dropping solution which were maintained at 25 to 30° C. were supplied dropwise respectively to the reaction vessel maintained at 79 to 81° C., over 210 minutes with metering pumps from separate storage tanks respectively while changing the supply rates as described below.

First, 1/10 of the total amount of the initiator dropping solution was supplied to the reaction vessel at a time, which point was taken as 0 minutes of the reaction time. As for the supply program of the initiator dropping solution thereafter, 1/10 of the total amount was supplied dropwise from 0 to 20 minutes, 2/10 of the total amount was supplied dropwise from 20 to 90 minutes, and 6/10 of the total amount was supplied dropwise from 90 to 210 minutes in the same manner as in Example 1. On the other hand, as for the supply program of the monomer dropping solution, 1/9 of the total amount was supplied dropwise from 0 to 20 minutes, 2/9 of the total amount was supplied dropwise from 20 to 90 minutes, and 6/9 of the total amount was supplied dropwise from 90 to 210 minutes in the same manner as in Example 1.

Figure 5:
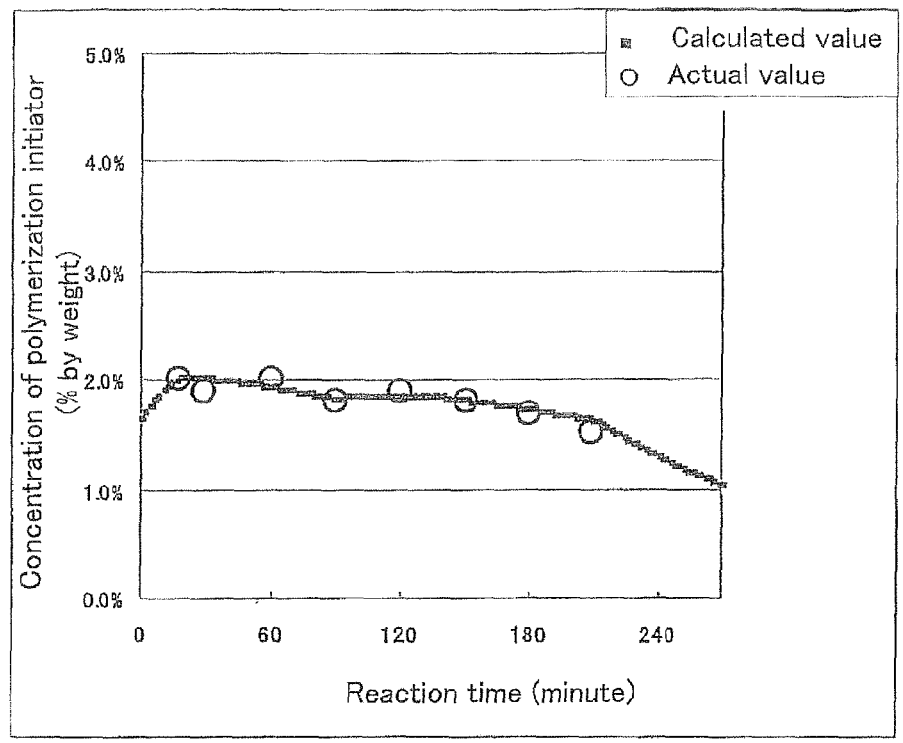
FIG. 5 shows change in the concentration of the polymerization initiator with time in polymerization reaction in Example 2.
Figure 6:
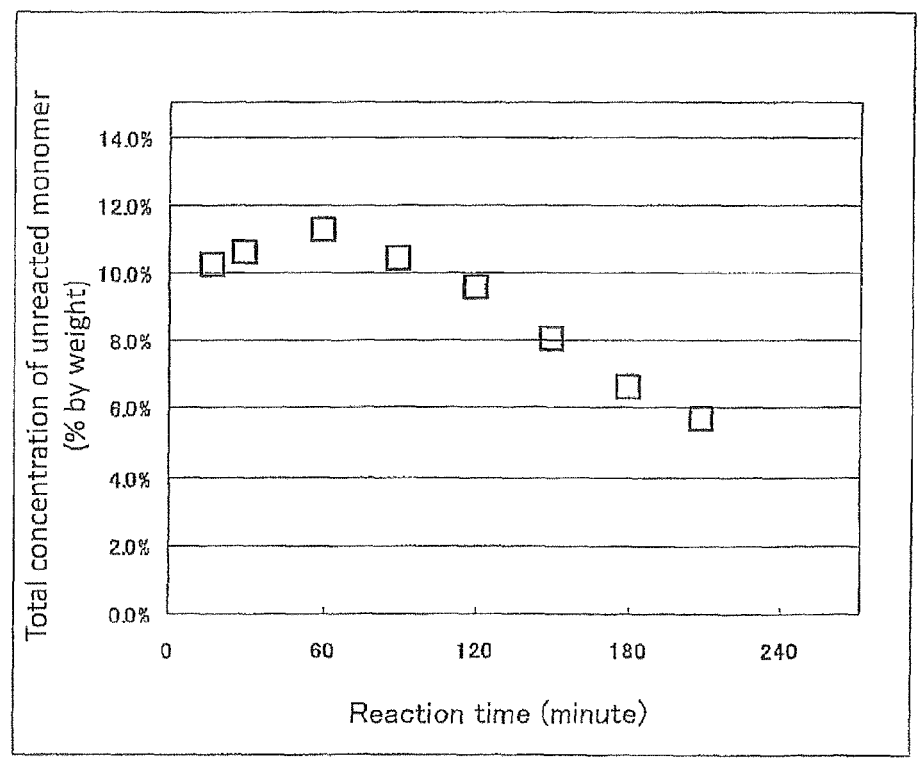
FIG. 6 shows change in the total concentration of the unreacted monomers with time in polymerization reaction in Example 2.

After completion of dropwise addition, the resulting mixture was further stirred for 1 hour while keeping the temperature to continue polymerization reaction and then cooled to room temperature. The purification, drying step and analysis in each stage thereafter were carried out in the same manner as in Example 1. The analytical results of the concentrations of the polymerization initiator and the concentrations of the unreacted monomer in the polymerization reaction were shown in FIG. 5 and FIG. 6, and the analytical results of the copolymer were shown in Table 1. The calculated values of the concentrations of the polymerization initiator calculated by the calculational procedure described in "Method for Determining Supply Rate of Polymerization Initiator" were also shown in FIG. 5.

Comparative Example 2

Production of M/G/O Copolymer

The monomer G, the monomer M and the monomer O were used to prepare a monomer dropping solution in the same manner as in Example 2. Also, 53 g of dimethyl 2,2'-azobisisobutyrate (11.5% by mole with respect to the total amount of monomers) was dissolved in 107 g of methyl ethyl ketone to prepare an initiator dropping solution. To a 2 L four-necked flask reaction vessel made of glass equipped with a stirrer and a condenser, 240 g of methyl ethyl ketone was added, and after keeping the inside of the reaction vessel under nitrogen atmosphere, methyl ethyl ketone in the reaction vessel was heated to 79° C. The monomer dropping solution and the initiator dropping solution which were maintained at 25 to 30° C. were supplied dropwise respectively at a constant rate to the reaction vessel maintained at 79 to 81° C., over 180 minutes with metering pumps from separate storage tanks respectively.

Figure 7:
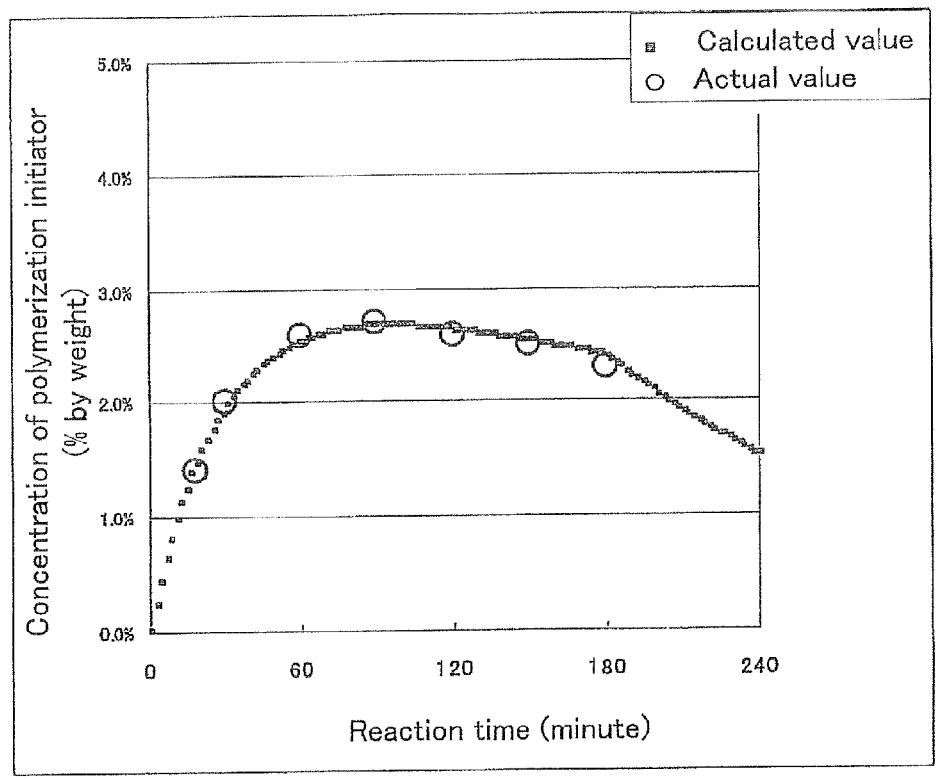
FIG. 7 shows change in the concentration of the polymerization initiator with time in polymerization reaction in Comparative Example 2.
Figure 8:
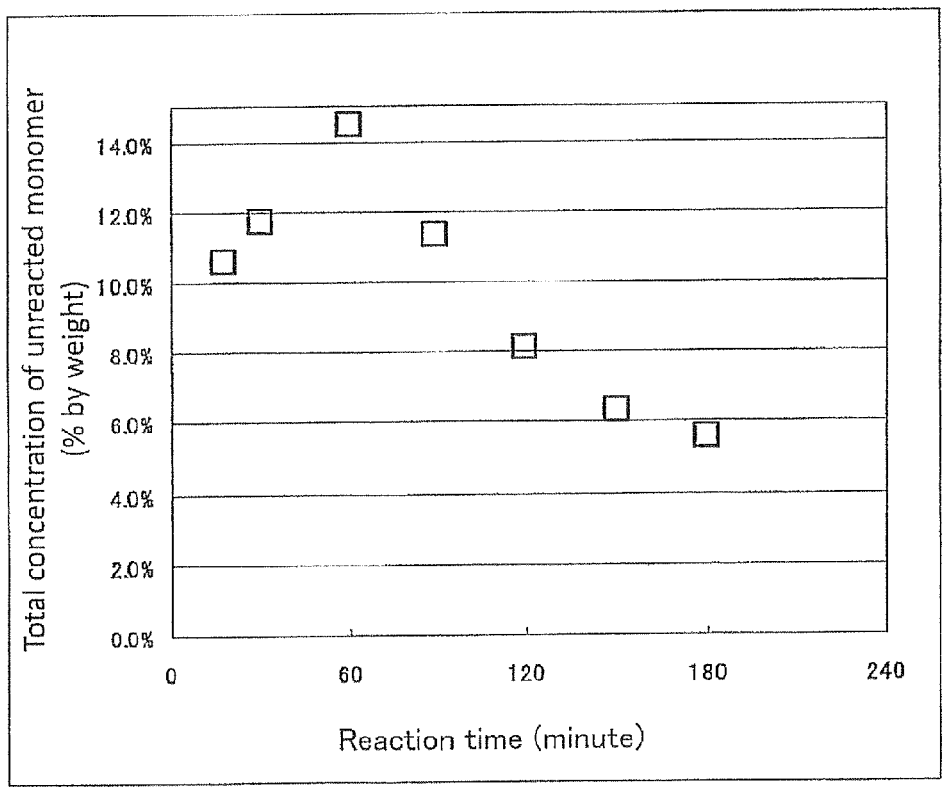
FIG. 8 shows change in the total concentration of the unreacted monomers with time in polymerization reaction in Comparative Example 2.

After completion of dropwise addition, the resulting mixture was further stirred for 1 hour while keeping the temperature to continue polymerization reaction and then cooled to room temperature. The purification, drying step and analysis in each stage thereafter were carried out in the same manner as in Example 1. The analytical results of the concentrations of the polymerization initiator and the concentrations of the unreacted monomer in the polymerization reaction were shown in FIG. 7 and FIG. 8, and the analytical results of the copolymer were shown in Table 1. The calculated values of the concentrations of the polymerization initiator calculated by the calculational procedure described in "Method for Determining Supply Rate of Polymerization Initiator" were also shown in FIG. 7.

Example 3

Production of Mp/I/G/N/O Copolymer

In 415 g of methyl ethyl ketone, 47 g of the monomer Mp, 136 g of the monomer I, 116 g of the monomer G, 67 g of the monomer N and 52 g of the monomer O were dissolved to prepare a monomer dropping solution. Also, 41 g of dimethyl 2,2'-azobisisobutyrate (9.0% by mole with respect to the total amount of monomers) was dissolved in 119 g of methyl ethyl ketone to prepare an initiator dropping solution. To a 2 L four-necked flask reaction vessel made of glass equipped with a stirrer and a condenser, 253 g of methyl ethyl ketone was added, and after keeping the inside of the reaction vessel under nitrogen atmosphere, methyl ethyl ketone in the reaction vessel was heated to 79° C. The initiator dropping solution and the monomer dropping solution were maintained at 25 to 30° C. in separate storage tanks respectively, and were supplied to the reaction vessel with metering pumps. First, 8% of the total amount of the initiator dropping solution was supplied to the reaction vessel at a time, which point was taken as 0 minutes of the reaction time. Thereafter, the monomer dropping solution and the residual initiator dropping solution were supplied dropwise at a constant rate over 240 minutes to the reaction vessel maintained at 79 to 81° C.

Figure 9:
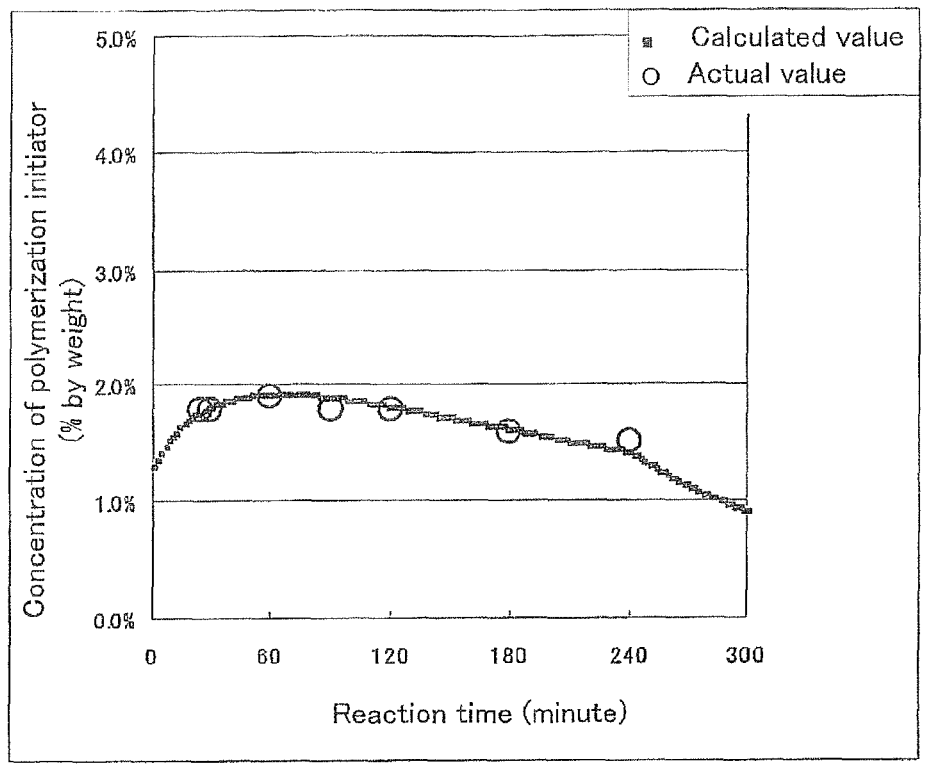
FIG. 9 shows change in the concentration of the polymerization initiator with time in polymerization reaction in Example 3.
Figure 10:
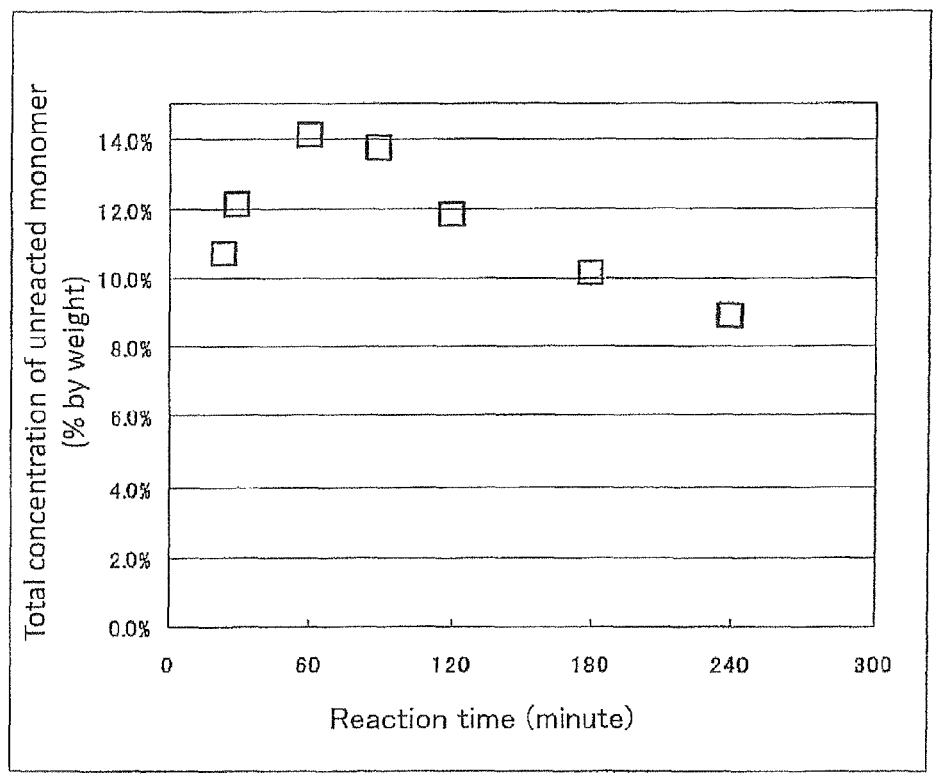
FIG. 10 shows change in the total concentration of the unreacted monomers with time in polymerization reaction in Example 3.

After completion of dropwise addition, the resulting mixture was further stirred for 1 hour while keeping the temperature to continue polymerization reaction and then cooled to room temperature. The purification, drying step and analysis in each stage thereafter were carried out in the same manner as in Example 1. The analytical results of the concentrations of the polymerization initiator and the concentrations of the unreacted monomer in the polymerization reaction were shown in FIG. 9 and FIG. 10, and the analytical results of the copolymer were shown in Table 1. The calculated values of the concentrations of the polymerization initiator calculated by the calculational procedure described in "Method for Determining Supply Rate of Polymerization Initiator" were also shown in FIG. 9.

Comparative Example 3

Production of Mp/I/G/N/O Copolymer

The monomer Mp, the monomer I, the monomer G, the monomer N and the monomer O were used to prepare a monomer dropping solution in the same manner as in Example 3. Also, 55 g of dimethyl 2,2'-azobisisobutyrate (12% by mole with respect to the total amount of monomers) was dissolved in 105 g of methyl ethyl ketone to prepare an initiator dropping solution. To a 2 L four-necked flask reaction vessel made of glass equipped with a stirrer and a condenser, 253 g of methyl ethyl ketone was added, and after keeping the inside of the reaction vessel under nitrogen atmosphere, methyl ethyl ketone in the reaction vessel was heated to 79° C. The monomer dropping solution and the initiator dropping solution which were maintained at 25 to 30° C. were supplied dropwise respectively at a constant rate to the reaction vessel maintained at 79 to 81° C., over 180 minutes with metering pumps from separate storage tanks respectively.

Figure 11:
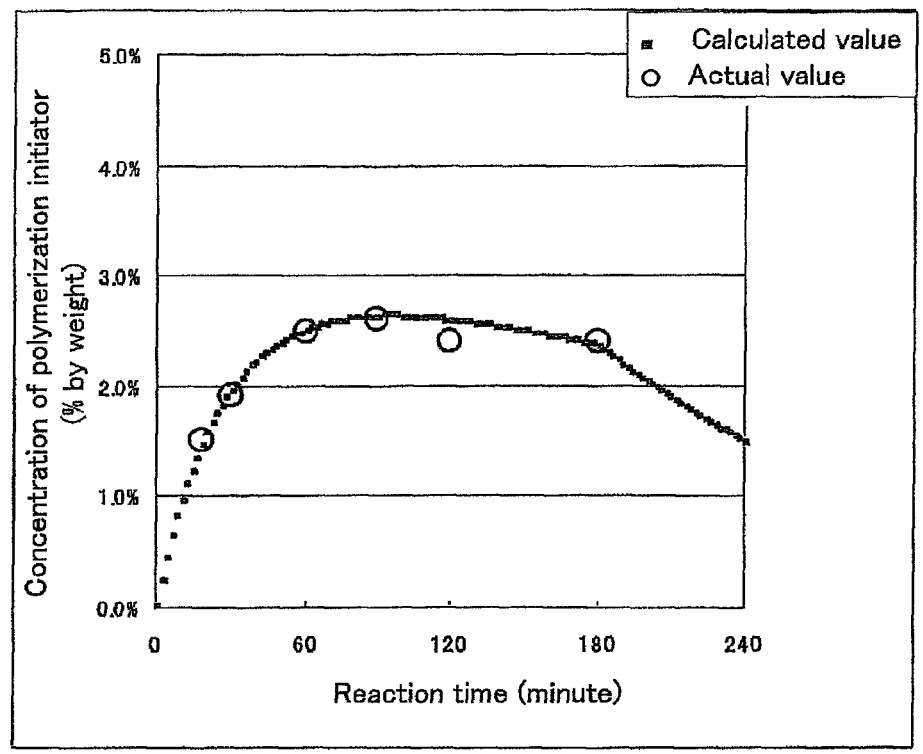
FIG. 11 shows change in the concentration of the polymerization initiator with time in polymerization reaction in Comparative Example 3.
Figure 12:
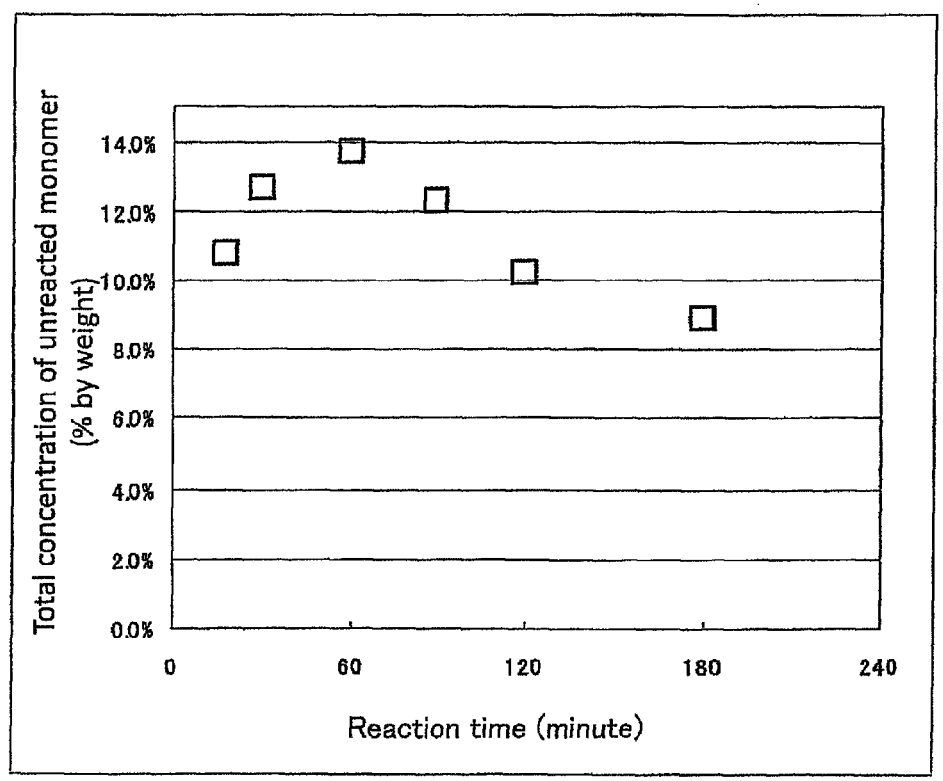
FIG. 12 shows change in the total concentration of the unreacted monomers with time in polymerization reaction in Comparative Example 3.

After completion of dropwise addition, the resulting mixture was further stirred for 1 hour while keeping the temperature to continue polymerization reaction and then cooled to room temperature. The purification, drying step and analysis in each stage thereafter were carried out in the same manner as in Example 1. The analytical results of the concentrations of the polymerization initiator and the concentrations of the unreacted monomer in the polymerization reaction were shown in FIG. 11 and FIG. 12, and the analytical results of the copolymer were shown in Table 1. The calculated values of the concentrations of the polymerization initiator calculated by the calculational procedure described in "Method for Determining Supply Rate of Polymerization Initiator" were also shown in FIG. 11.

TABLE 1

| | At the completion of polymerization reaction | | | After purification and drying | | | Copolymer composition ratio (molar ratio) | | | | | | Change in concentration of polymerization initiator in polymerization solution *2 | | Change in concentration of unreacted monomer in polymerization solution *3 | |
|---|---|---|---|---|---|---|---|---|---|---|---|---|---|---|---|---|
| | | | Oligomer | | | Oligomer | | | | | | | maximum value-minimum value (wt %) | variation range ± Δ (%) *4 | maximum value-minimum value (wt %) | variation range ± Δ (%) *4 |
| | Mw | Mw/Mn | (%) *1 | Mw | Mw/Mn | (%) *1 | M | I | Mp | G | N | O | | | | |
| Example 1 | 5400 | 1.83 | 4.8 | 5600 | 1.72 | 3.3 | | | 49 | 51 | | | 2.1-1.9 | 5.0 | 6.3-3.4 | 29.9 |
| Comparative Example 1 | 5400 | 1.99 | 6.7 | 5600 | 1.83 | 4.8 | | | 49 | 51 | | | 2.8-1.4 | 33.3 | 9.1-3.2 | 48.0 |
| Example 2 | 4500 | 1.8 | 5.6 | 4800 | 1.65 | 3.3 | 40 | | | 41 | | 19 | 2.0-1.5 | 14.3 | 11.2-5.7 | 32.5 |
| Comparative Example 2 | 4400 | 1.99 | 10.9 | 4800 | 1.75 | 5.6 | 40 | | | 41 | | 19 | 2.7-1.5 | 28.6 | 14.4-5.6 | 44.0 |
| Example 3 | 4000 | 1.78 | 7.5 | 4500 | 1.47 | 3.2 | | 17 | 14 | 39 | 18 | 12 | 1.9-1.5 | 11.8 | 14.0-8.9 | 22.3 |
| Comparative Example 3 | 3900 | 1.96 | 11.6 | 4500 | 1.62 | 5.6 | | 17 | 14 | 39 | 18 | 12 | 2.6-1.5 | 26.8 | 13.7-8.9 | 21.2 |

*1 the oligomer is a component having a Mw of not more than 1000
*2 change in the concentration of the polymerization initiator in polymerization solution during the time from the point where 10% by mole of the monomer was added dropwise to the point where the dropwise addition of the monomer solution was completed
*3 change in the total concentration of the unreacted monomer in polymerization solution during the time from the point where 10% by mole of the monomer was added dropwise to the point where the dropwise addition of the monomer solution was completed
*4 Rate of the variation range to the median value between the maximum value and the minimum value From comparisons of Example 1, Example 2, and Example 3 with Comparative Example 1, Comparative Example 2, and Comparative Example 3 respectively, the effect for reducing the amount of the generated oligomer having a molecular weight of not more than 1000 by 20 to 50% without changing various properties such as weight-average molecular weight, molecular weight distribution (Mw/Mn), copolymer composition and the like was observed in either case.

By suppressing the variation of the concentration of the polymerization initiator and the concentration of the unreacted monomer in polymerization reaction system, the polymerization initiator can be acted effectively, and by decreasing the amount of used polymerization initiator accordingly, the by-production of the oligomer can be suppressed, so that the resist copolymer having a weight-average molecular weight of not less than 3000 and not more than 6000 can be produced efficiently.

The invention claimed is:

1. A method for producing a resist copolymer having a weight-average molecular weight of not less than 3000 and not more than 6000, said method comprising the step of continuously supplying a solution containing a monomer and a solution containing a polymerization initiator to a heated solvent in a polymerization tank to carry out a radical polymerization;
   wherein 1 to 10% by weight of a total amount of supplied polymerization initiator is supplied to the polymerization tank prior to the supply of the monomer solution; and
   wherein the variation range of the concentration of the polymerization initiator in polymerization solution is within ±25% of the median value between the maximum concentration and the minimum concentration during the time from the point where the amount of the supplied monomer reaches to 10% by mole of the total amount of the monomer to supply to the point where the supply of monomer solution is completed; and the variation range of the concentration of an unreacted monomer in the polymerization solution is within ±35% of the median value between the maximum concentration and the minimum concentration during the time from the point where the amount of the supplied monomer reaches to 10% by mole of the total amount of the monomer to supply to the point where the supply of monomer solution is completed.

2. The method for producing a resist copolymer according to claim 1, wherein the variation range of the concentration of the polymerization initiator in the polymerization solution is within ±20% of the median value between the maximum concentration and the minimum concentration during the time.

3. The method for producing a resist copolymer according to claim 1, wherein the polymerization initiator is an azo compound.

4. The method for producing a resist copolymer according to claim 1, wherein the resist copolymer is a polymer which is made soluble in an alkaline developer by the action of an acid, and which comprises at least one repeating unit (A) having a structure in which an alkali-soluble group is protected with an acid-dissociable dissolution-inhibitive group, and which comprises a repeating unit (B) having a lactone structure, and/or a repeating unit (C) having a hydroxyl group or a carboxyl group.

* * * * *

UNITED STATES PATENT AND TRADEMARK OFFICE
CERTIFICATE OF CORRECTION

PATENT NO. : 8,759,462 B2
APPLICATION NO. : 13/675277
DATED : June 24, 2014
INVENTOR(S) : Oikawa It is certified that error appears in the above-identified patent and that said Letters Patent is hereby corrected as shown below:

In the Claims

Columns 43 and 44, Lines 45-39, Claim 1

Please replace claim 1 in its entirety with the following:

A method for producing a resist copolymer having a weight-average molecular weight of not less than 3000 and not more than 6000, said method comprising the step of continuously supplying a solution containing a monomer and a solution containing a polymerization initiator to a heated solvent in a polymerization tank to carry out a radical polymerization;
wherein 1 to 10% by weight of a total amount of supplied polymerization initiator is supplied to the polymerization tank prior to the supply of the monomer solution;
wherein the ratio of the total mole numbers of the supplied polymerization initiator to the total mole numbers of the supplied monomer is not more than 10% by mole;
wherein the variation range of the concentration of the polymerization initiator in polymerization solution is within ±25% of the median value between the maximum concentration and the minimum concentration during the time from the point where the amount of the supplied monomer reaches to 10% by mole of the total amount of the monomer to supply to the point where the supply of monomer solution is completed; and the variation range of the concentration of an unreacted monomer in the polymerization solution is within ±35% of the median value between the maximum concentration and the minimum concentration during the time from the point where the amount of the supplied monomer reaches to 10% by mole of the total amount of the monomer to supply to the point where the supply of monomer solution is completed; and
wherein the resist copolymer contains an oligomer having a molecular weight of not more than 1000 in an amount of not more than 10% of the total at the completion of the polymerization reaction.

Signed and Sealed this
Fourth Day of November, 2014

Michelle K. Lee
*Deputy Director of the United States Patent and Trademark Office*